US012728400B2

(12) United States Patent
Fatigati et al.

(10) Patent No.: US 12,728,400 B2
(45) Date of Patent: Sep. 8, 2026

(54) ELECTRICALLY HEATED REACTOR FOR ENDOTHERMIC PROCESSES

(71) Applicant: Raven SR, Inc., Pinedale, WY (US)

(72) Inventors: Michael A. Fatigati, Massillon, OH (US); Terry J. Mazanec, Solon, OH (US)

(73) Assignee: Raven SR, Inc., Pinedale, WY (US)

( * ) Notice: Subject to any disclaimer, the term of this patent is extended or adjusted under 35 U.S.C. 154(b) by 488 days.

(21) Appl. No.: 18/139,948

(22) Filed: Apr. 26, 2023

(65) Prior Publication Data

US 2024/0149241 A1 May 9, 2024

Related U.S. Application Data

(60) Provisional application No. 63/363,606, filed on Apr. 26, 2022.

(51) Int. Cl.

| | |
|---|---|
| ***B01J 19/32*** | (2006.01) |
| ***B01J 19/00*** | (2006.01) |
| ***B01J 19/24*** | (2006.01) |
| ***C01B 3/34*** | (2006.01) |

(52) U.S. Cl.

CPC ........... *B01J 19/32* (2013.01); *B01J 19/0013* (2013.01); *B01J 19/006* (2013.01); *B01J 19/246* (2013.01); *B01J 19/2465* (2013.01); *C01B 3/34* (2013.01); *B01J 2219/00081* (2013.01); *B01J 2219/00092* (2013.01); *B01J 2219/00135* (2013.01); *C01B 2203/0216* (2013.01); *C01B 2203/085* (2013.01); *C01B 2203/0883* (2013.01); *C01B 2203/1241* (2013.01)

(58) Field of Classification Search

CPC ...... B01J 19/32; B01J 19/0013; B01J 19/006; B01J 19/246; B01J 19/2465; B01J 2219/00081; B01J 2219/00092; B01J 2219/00135; C01B 3/34; C01B 2203/0216; C01B 2203/085; C01B 2203/0883; C01B 2203/1241

See application file for complete search history.

(56) References Cited

U.S. PATENT DOCUMENTS

| | | | | |
|---|---|---|---|---|
| 8,865,117 | B2 * | 10/2014 | De Groot | B01J 19/2485 422/163 |
| 9,222,733 | B2 * | 12/2015 | Pazzaglia | B01J 12/00 |
| 2005/0129593 | A1 * | 6/2005 | Hotta | B01J 8/0085 422/198 |
| 2007/0187079 | A1 * | 8/2007 | Shin | B01J 8/008 165/159 |

(Continued)

*Primary Examiner* — Charles S Bushey

(74) *Attorney, Agent, or Firm* — Dentons Bingham Greenebaum LLP; Brian W. Chellgren; Gerald W. Roberts

(57) ABSTRACT

Designs for electrically heated reactors are disclosed. In one embodiment, a cylindrical reactor design to provide high temperature heat for an endothermic steam methane reformer without combustion includes: a cylindrical shell, one or more parallel internal cylindrical return tubes, baffles perpendicular to the axis of the shell, electrical heating elements disposed parallel to the shell axis and arranged in one or more rings extending through one or more baffles, and fitted with annular gas entrance and cylindrical gas outlet plena attached to one end of the device.

12 Claims, 11 Drawing Sheets
(8 of 11 Drawing Sheet(s) Filed in Color)

(56) References Cited

U.S. PATENT DOCUMENTS

| | | | | |
|---|---|---|---|---|
| 2022/0134298 | A1* | 5/2022 | Marker | C01B 3/342<br>252/373 |
| 2023/0285954 | A1* | 9/2023 | Neifert | B01J 38/12 |
| 2024/0173691 | A1* | 5/2024 | Ratnakar | B01J 19/0013 |

* cited by examiner

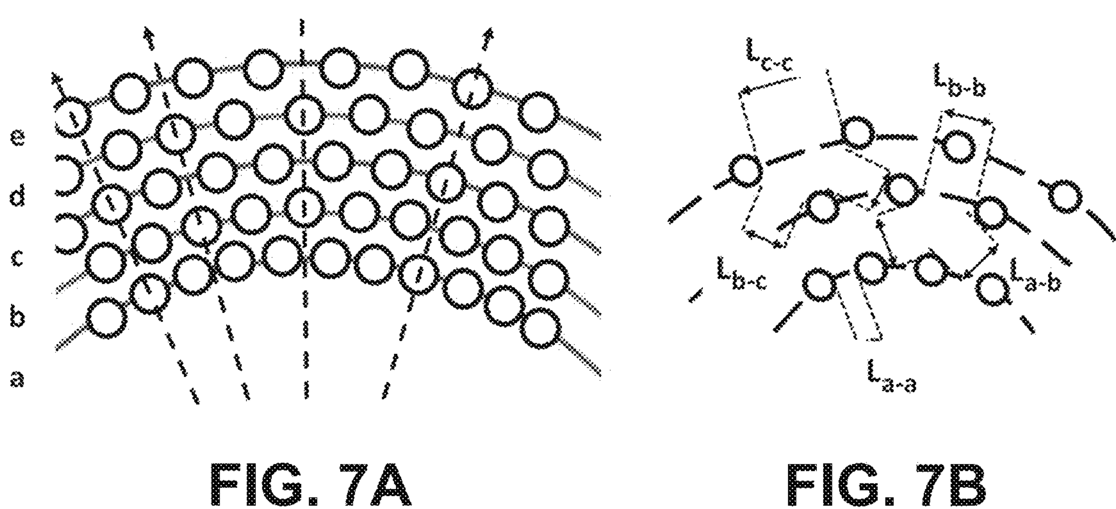
FIG. 7A
FIG. 7B
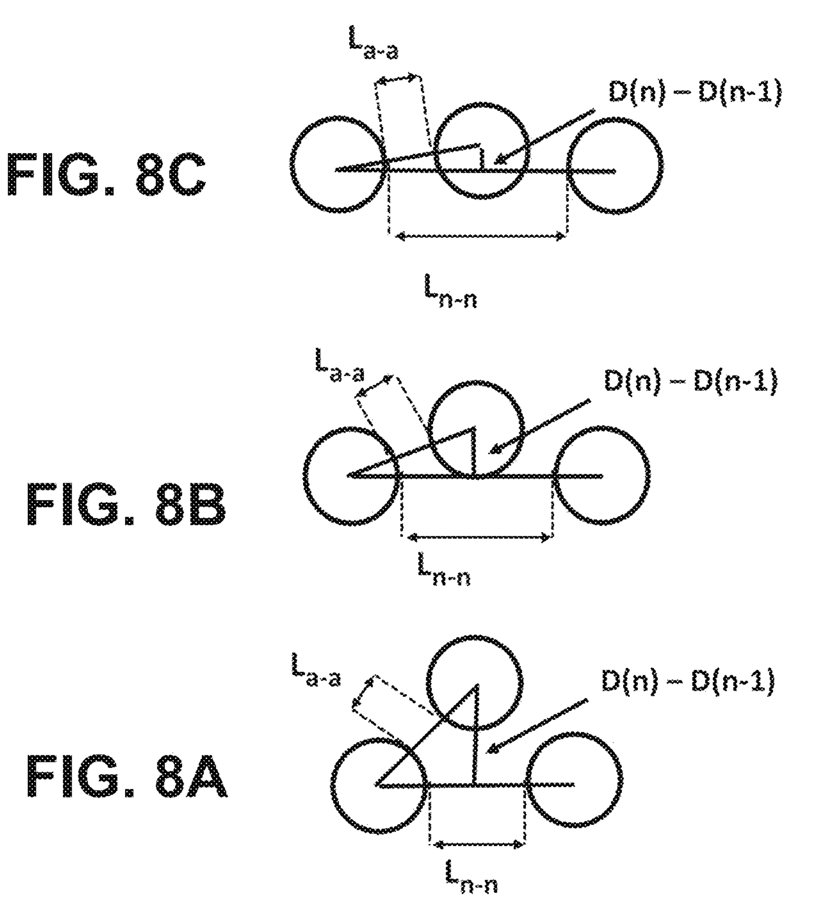
FIG. 8C
FIG. 8B
FIG. 8A

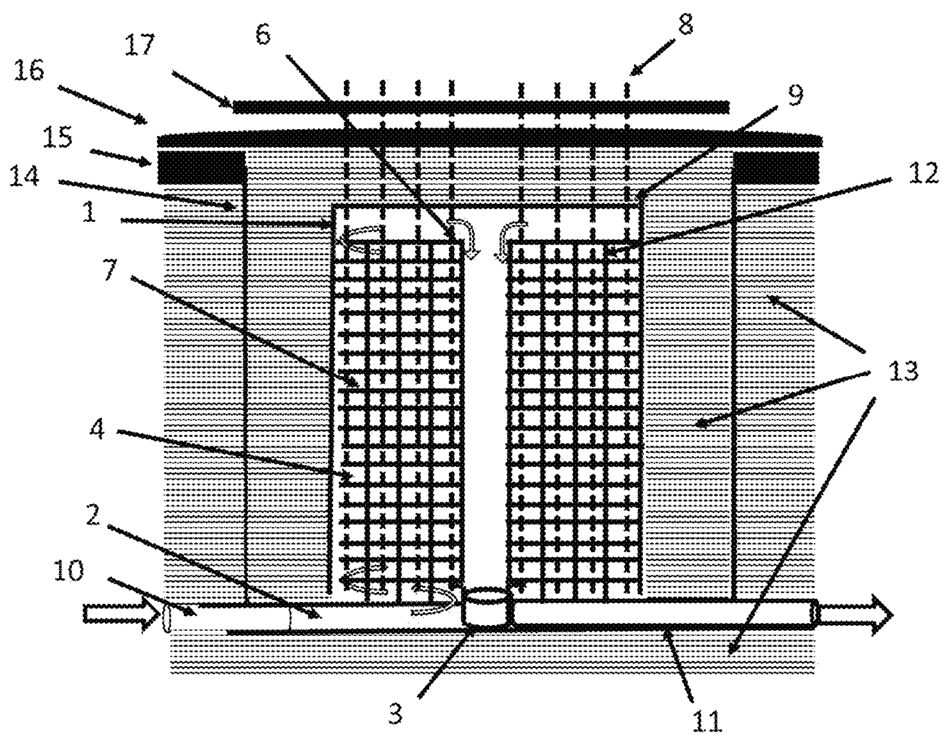
FIG. 9
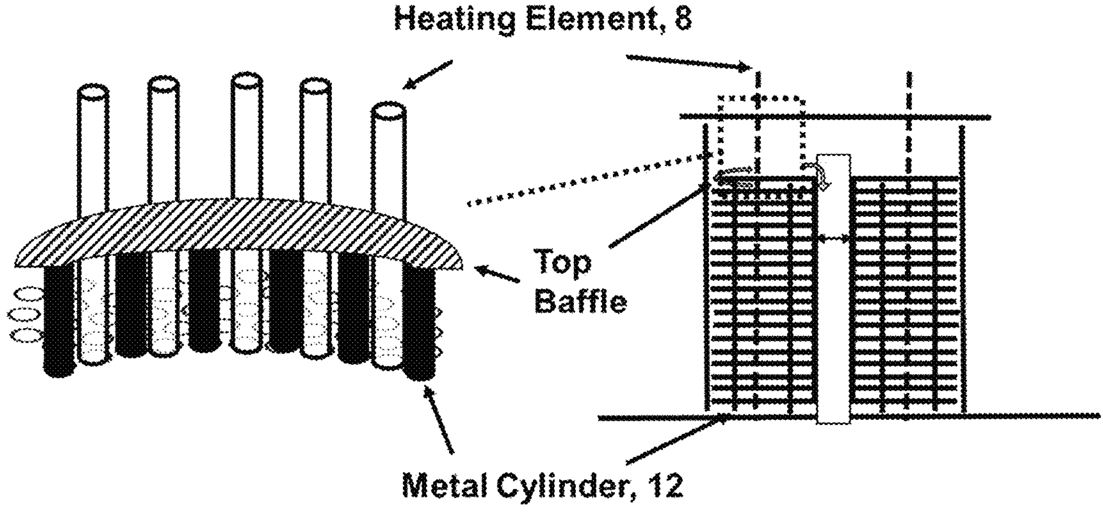
FIG. 10A
FIG. 10B

ELECTRICALLY HEATED REACTOR FOR ENDOTHERMIC PROCESSES

CROSS REFERENCE TO RELATED APPLICATION(S)

This application claims the benefit of priority to U.S. Provisional Patent Application No. 63/363,606, filed Apr. 26, 2022, which is incorporated herein by reference.

FIELD OF THE INVENTION

This invention relates to electrically heated reactors for conducting endothermic reactions, and, more particularly, to design configurations for reactors that achieve high feed conversions with efficient use of energy without combustion.

BACKGROUND OF THE INVENTION

Endothermic processes require the input of significant amounts of energy. Traditionally, the energy has been derived from the combustion of fossil fuels such as natural gas, naphtha, oil, or coal, and numerous reactor designs were developed to utilize these fuels. Conventional heat transfer by convection, conduction, and/or radiation from fossil fuel combustion can be slow and is often the limiting feature of a process. As the reliance on fossil fuels declines, electricity is becoming the energy source of choice because it can be produced from renewable sources such as solar, wind, biomass, wastes, or nuclear materials, and is readily transported over transmission lines. These alternate energy resources are numerous and are distributed more widely and are not as concentrated as fossil energy resources, so processes are needed that are adapted for use at a scale that matches the scale of the available resources. Since proportionately higher heat losses are encountered at smaller scales, more efficient reactors are needed. Electrical energy can also be very accurately controlled to provide the precise amount of energy in specific locations within a reactor. Conventional reactor designs are not optimized for the use of electrical energy, so alternate reactor designs are needed to enable electrical energy to be used efficiently.

Electrically heated reactors can be designed differently from combustion heated reactors because the electrical energy can be supplied by resistance heated elements that can be positioned either external to or within the reaction zone. In particular, gas and liquid phase reactions are amenable to the efficient use of electrical energy since fluids can be contacted directly with such heating elements to enhance heat transfer and provide precise, localized control of temperature. Processes that are particularly amenable to the use of electrical energy include the upgrading of light hydrocarbons to more valuable products.

Galloway, in U.S. Pat. No. 10,479,680 B2, describes a reactor design for upgrading waste gas mixtures that includes a bottom annular plenum in fluid communication with an annular plenum containing electrical heating elements, a bottom cylindrical plenum connected to a cylindrical plenum, co-axial with and in fluid communication with the annular plenum, wherein the bottom annular plenum surrounds the bottom cylindrical plenum, and the annular plenum surrounds the cylindrical plenum, and the bottom plena include ports for gas inlet and outlet, respectively. Various features are described, such as fins and aerodynamic strakes, to increase turbulence and enhance heat transfer to the gas, but the heat transfer is undesirably inefficient and the conversion of methane is undesirably low.

Mortensen et al., in United States Patent Application Publication No. 2021/0171344, describe a resistively heated steam reforming reactor wherein the energy is supplied by passing current through an electrically conductive structured catalyst body while passing process gas through the structured catalyst.

Wismann et al., in "Electrified methane reforming: A compact approach to greener industrial hydrogen production," Science 364 (6442), 756-759 (2019), describe an electrically heated catalytic structure installed directly into a steam-methane reforming reactor for hydrogen production. There, heat is provided by resistance by passing current through the electrically conductive catalyst structure.

Haldor Topsøe has published patents and patent applications for the use of electrical energy to produce CO (U.S. Pat. No. 10,494,728) or mixtures of CO and hydrogen (United States Patent Application Publication No. 2013/0109767 and United States Patent Application Publication No. 2021/0054510) from CO2 containing gas mixtures wherein a solid oxide electrochemical cell is used to electrolytically reduce $CO_2$ to CO.

Ringler et al., in United States Patent Application Publication No. 2007/0084116, describe an electrically ignited oxidative reformer wherein the process gases are heated to temperature by a resistively heated structure and the oxidative reforming continues without further input of energy.

Karpenko (of Bayer), in United States Patent Application Publication No. 2015/0129805, describes a resistively heated flow-through catalytic element used to promote endothermic reactions alternated with a ceramic or other material used to promote exothermic reactions.

Rieks et al., in "Experimental study of methane dry reforming in an electrically heated reactor", Intl J Hydrogen Energy 40(46) 2015, report results of experiments and calculations on a conductive catalyst structure resistively heated to provide energy for dry reforming and the reverse water gas shift reaction.

A particular problem has been providing heat for a conventional tubular steam methane reformer, which is essentially a large heat exchanger with heat transfer as the rate limiting step. Typically, the temperature of the gas within the tubes of such a reformer has been considerably lower than the temperature of the skin of the tubes due to the endothermic reaction occurring therein. Thus, the associated process has been limited by the heat transfer rate through the walls of the tubes and the endothermic nature of the steam reforming reaction. An additional problem with conventional reactors for upgrading light hydrocarbons (e.g., methane) to synthesis gas has been the inability to reach high temperatures without combustion. Another problem with high temperature hydrocarbon processes has been the tendency for coking to occur, causing the reactor to be taken out of service for coke removal with air, or steam, or both, or by other methods.

SUMMARY OF THE INVENTION

It is an object of the present invention to provide an electrically heated reactor for the steam reforming of methane or other endothermic reaction processes. It is also an object of the invention to provide a reactor with integrated electrical heat supply and catalysts. It is furthermore an object of the present invention to provide a reactor for an endothermic reaction where the temperature of the endothermic reaction is controlled precisely to limit unwanted side reactions, e.g. cracking of hydrocarbons in dehydrogenation reactions.

An advantage of the present invention is that the electrical energy supplied to the reactor is efficiently used for the chemical process. Another advantage of the invention is that the overall emission of carbon dioxide and other unwanted emissions may be reduced considerably when the power supplied to the reactor is from renewable energy resources. Yet another advantage of the present invention is that the tendency for coke formation is low.

Various embodiments of the present invention provide improved reactor designs to provide high conversion of light hydrocarbons, high yield of synthesis gas, highly efficient use of energy, and the avoidance of carbon dioxide formation by combustion. Other embodiments provide reactor designs that are suitable for the dehydrogenation of ethane, propane, butane, naphtha, or ethyl benzene, ammonia decomposition, methanol decomposition, or hydrogen cyanide synthesis, or other endothermic processes.

Some embodiments of the invention provide a reactor for carrying out an endothermic reaction of a feed fluid. The reactor includes an external cylindrical shell, having a flow path extending within the shell assembly from the inlet to the outlet and defining a cylindrical reaction plenum. The reactor also includes a cylindrical outlet plenum attached at the end of the cylindrical shell. The reactor also includes an inlet conduit for receiving fluid and an outlet conduit for discharging fluid, where the inlet conduit is in fluid communication with the cylindrical reaction plenum or an annular plenum in fluid communication with the cylindrical reaction plenum, and the outlet conduit is in fluid communication with the cylindrical outlet plenum. The reactor also includes one or more cylindrical return tubes disposed within the cylindrical reaction plenum, and where the cylindrical reaction plenum is in fluid communication with the one or more cylindrical return tubes. The reactor also includes two or more baffles that are perpendicular to the axis of the cylindrical shell within the cylindrical reaction plenum or the one or more return tubes or both. The reactor also includes a passage through each of the one or more baffles that is less than 20% of the cross-sectional area of each baffle in the cylindrical reaction plenum or return tube, such that the passages of any two consecutive baffles alternate in their distance from the axis of the cylindrical reaction plenum or return tube. The reactor also includes one or more electrically driven heating elements within the shell and disposed parallel to the axis of the shell and extending through one or more of the baffles.

The layout of the reactor may allow for feeding a pressurized feed fluid to the reactor at an inlet conduit and directing this fluid into the shell of the reactor. Inside the shell, a configuration of baffles may be arranged to direct the feed fluid between the electrical heating elements to facilitate heat transfer. The heating of the heating elements supplies heat for the endothermic reaction. The product may then flow to the reactor outlet conduit.

The direct contact between the process fluids and the electrical heating elements may enable efficient heating of fluids by heat conduction, convection, and/or radiation from the resistance heated electrical heating elements. A feature of the associated resistance heating process is that heat may be generated inside the reactor itself as opposed to all being supplied from an external heat source. Moreover, the hottest part of the reactor may be within the shell of the reactor. Preferably, the electrical power supply and the heating elements are dimensioned so that at least part of the heating elements reaches a temperature of at least 1023 K-1373 K when the endothermic reaction is the steam reforming reaction, a temperature of 973-1473 K when the endothermic reaction is the hydrogen cyanide synthesis, a temperature of 773-973 K when the endothermic reaction is dehydrogenation, a temperature of 473-573 K when the endothermic reaction is methanol cracking, and a temperature of about 773 K when the endothermic reaction is the ammonia cracking reaction.

The surface area of the heating elements, the fraction of the heating elements coated with a ceramic coating, the type and structure of the ceramic coating, and the amount and composition of the catalytically active catalyst material may be tailored to the specific endothermic reaction at the given operating conditions.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some of the figures shown in the present disclose may include dimensions. Further, the figures shown herein may have been created from scaled drawings, scaled models, or from photographs that are scalable. It is understood that such dimensions, or the relative scaling within a figure, are by way of example, and not to be construed as limiting unless so stated in a claim. Persons of ordinary skill will also recognize that computer-aided design ("CAD") renderings may include lines that pertain to changes in surface geometry, and not necessarily to component features.

FIG. 7A depicts a schematic of an arrangement of heating elements, metal cylinders, or return tubes, or some combination of these in a portion of several rings within a reactor according to an exemplary embodiment of the present invention.

FIG. 7B depicts another schematic of the arrangement of FIG. 7A.

FIGS. 8A, 8B, and 8C depict geometries between elements of successive rings as the ring diameter becomes larger for a reactor according to an exemplary embodiment of the present invention.

FIG. 9 depicts a schematic side view of a reactor according to an exemplary embodiment of the present invention that includes metal cylinders.

FIGS. 10A and 10B show an arrangement of the heating elements and metal cylinders in a region of a top baffle of a reactor according to an exemplary embodiment of the present invention.

DETAILED DESCRIPTION OF PREFERRED EMBODIMENTS

Figure 1:
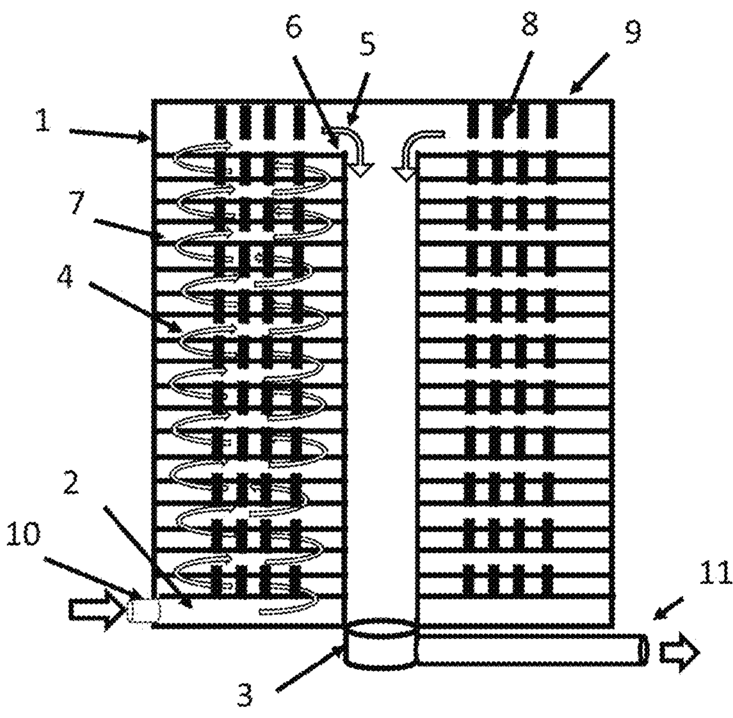
FIG. 1 depicts a schematic side view of a reactor according to an exemplary embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "various embodiments" or "preferably," refers to features and aspects that are present in at least one embodiment, but which are optional for some embodiments, it therefore being understood that use of the word "preferably" implies the term "optional."

Like reference numerals refer to like parts throughout the description and the drawings. Additionally, the use of an N-series prefix for an element number (NXX.XX) refers to an element that is the same as the non-prefixed element (XX.XX), except as shown and described. As an example, an element 1020.1 would be the same as element 20.1, except for those different features of element 1020.1 shown and described. Further, common elements and common features of related elements may be drawn in the same manner in different figures, and/or use the same symbology in different figures. As such, it is not necessary to describe the features of 1020.1 and 20.1 that are the same, since these common features are apparent to a person of ordinary skill in the related field of technology. Further, it is understood that some features 1020.1 and 20.1 may be backward compatible, such that a feature of a later discussed embodiment (NXX.XX) may include features compatible with other various embodiments that were discussed earlier (MXX.XX), as would be understood by those of ordinary skill in the art. This description convention also applies to the use of prime ('), double prime ("), triple prime (''') and star or asterisk (*) suffixed element numbers. Therefore, it is not necessary to describe the features of 20.1, 20.1', 20.1", 20.1''' and 20* that are the same, since these common features are apparent to persons of ordinary skill in the related field of technology.

What follows are paragraphs that express particular embodiments of the present invention. In those paragraphs that follow, some element numbers are prefixed with an "X" indicating that the words pertain to any of the similar features shown in the drawings or described in the text. However, those of ordinary skill in the art will recognize various other non-X prefixed element numbers that discuss features applicable to other embodiments.

This document may use different words to describe the same element number, or to refer to an element number in a specific family of features (NXX.XX). It is understood that such multiple, different words are not intended to provide a redefinition of any language herein. It is understood that such words demonstrate that the particular feature can be considered in various linguistical ways, such ways not necessarily being additive or exclusive.

Unless otherwise expressly stated herein, as used in this description and the claims the term 'elements' refers to 'heating elements' (described below), or metal cylinders, or metal tubes, or some combination of these for the purposes of defining the geometry of a reactor design.

Unless otherwise expressly stated herein, as used in this description and the claims 'heating elements' are electrically energized resistance heaters, typically wrapped in a ceramic shell, housed in a metal sheath, and typically comprising one or more controllable heating regions along the length of the element, such as those available from Watlow or other manufacturers. Accordingly, some heating elements may be long narrow heaters that are from 0.25 to 2.0 inches (0.64-5.0 cm) in diameter and from 12 to 180 inches (30 to 460 cm) in length and may be capable of supplying from 1.0 $W/in^2$ to 40 $W/in^2$ (0.15-6.2 W/cm 2) of energy. Also, some heating elements may have electrical connections at one end and may be sealed at an opposing end.

Unless otherwise expressly stated herein, as used in this description and the claims 'baffles' are structures that serve to restrain, deflect, or direct flow of fluids in a particular direction. A baffle blocks a portion of a flow path, leaving a passage through the plane of the baffle. 'Inside flow' baffles are those baffles that have flow-through paths parallel to the axis of the shell near their internal perimeters, i.e., closer to the axis of the device, such that gas flows parallel to the axis of the device nearer the inside of the device, while 'outside flow' baffles are those that have flow-through paths parallel to the axis of the device near their external perimeter, i.e., farther from the axis of the device, so that fluid flows in a direction parallel to the axis of the device nearer the outside of the device. Fluid flow between two baffles is perpendicular to the axis of the device in a radial direction, either towards or away from the center axis of the device.

Unless otherwise expressly stated herein, as used in this description and the claims the 'free flow area' is the area of a baffle that is not blocked by the baffle, i.e., a flow through passage through a baffle where fluid can flow through the plane of the baffle, allowing fluid to flow to the next level. The passage that is left open to free flow through the plane of the baffle is characterized as the unblocked fraction (%) of the entire flow path, e.g. a baffle that blocks 8 cm 2 of a 10 cm 2 flow path is said to have 2 cm 2 or 20% free flow area.

Unless otherwise expressly stated herein, as used in this description and the claims, 'heat sink cylinders' or 'blanks' are metal or ceramic cylinders situated within the reaction plenum that modify the fluid flow pattern, provide thermal ballast, and transfer heat to the reaction gases.

Unless otherwise expressly stated herein, as used in this description and the claims 'return tubes' are cylindrical tubes running parallel to the axis of the device, extending from within the device to a cylindrical outlet plenum, in fluid communication with the cylindrical reaction plenum and cylindrical outlet plenum, that permit gases to flow from the interior of the device to the cylindrical outlet plenum.

In the drawing figures, like parts are identified by like reference numerals, as follows:

TABLE 1

Items in Figures

| Reference Numerals | Corresponding Part(s) |
|---|---|
| 1 | external cylindrical shell |
| 2 | inlet plenum |
| 3 | cylindrical outlet plenum |
| 4 | cylindrical reaction plenum |
| 5 | gas flow path |
| 7 | baffles |
| 6 | cylindrical return tube |
| 8 | heating elements |
| 9 | top of the vessel |
| 10 | inlet conduit |
| 11 | outlet conduit |
| 12 | heat sink cylinders |
| 13 | insulating material |
| 14 | external cylinder |
| 15 | flange |
| 16 | attachment flange |
| 17 | thermal shield |
| 18 | return tubes |
| 19 | collection zone |
| 20 | 'outside flow' baffle |
| 21 | slots through baffles |
| 22 | concentric rings of elements |
| 23 | attachment tabs |
| 24 | 'inside flow' baffle |
| 25 | slots |
| 26 | attachment tabs |
| 27 | open region |

FIG. 1 depicts a schematic side view of one embodiment of the reactor design of this invention. An external cylindrical shell 1 contains an inlet plenum 2 and a cylindrical outlet plenum 3 attached to the bottom of shell 1. A cylindrical reaction plenum 4 in fluid communication with first annular plenum 2 surrounds an internal cylindrical return tube 6 that is in fluid communication with outlet plenum 3 and outlet conduit 11. Cylindrical reaction plenum 4 is in fluid communication with return tube 6 via gas flow path 5. Cylindrical reaction plenum 4 comprises baffles 7 that direct the reacting gases to contact heating elements 8 in a crossflow pattern to maximize turbulence and heat transfer. The baffles 7 are arranged in an alternating pattern of 'outside flow' and 'inside flow' baffles in the cylindrical reaction plenum 4 to provide plug flow and enhanced radial mixing as the gas passes in a sinusoidal fashion up through plenum 4. The vessel is fitted with electrical heating elements 8 that extend through the top of the vessel 9 and through some of the baffles. An inlet conduit 10 in fluid communication with first annular plenum 2, and an outlet conduit 11 in fluid communication with outlet plenum 3, are attached to the vessel to facilitate the flow of the reactants and products, respectively. The reactor defines a process flow through inlet conduit 10, inlet plenum 2, reaction plenum 4, return tube 6, outlet plenum 3, and outlet conduit 11.

Figure 2:
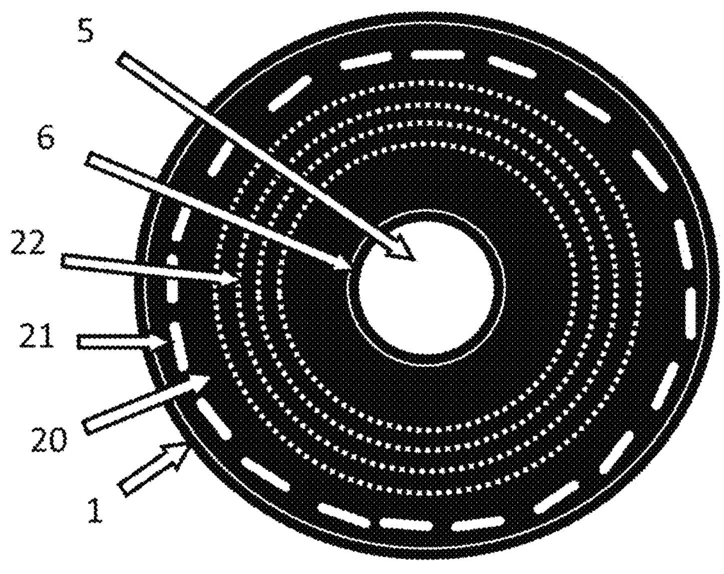
FIG. 2 depicts a schematic, top-down view of one type of 'outside flow' baffle 20 that may be incorporated into a reactor according to an exemplary embodiment of the present invention.

FIG. 2 depicts a schematic, top-down view of one type of 'outside flow' baffle 20 used in one embodiment of the inventive reactor. The baffle 20 is a thin, solid sheet that includes slots 21 to permit the flow of gases through the baffle from the entrance of the reactor to the exit up through the cylindrical reaction plenum 4, and heating elements arranged in concentric rings 22 that extend to or through the baffle at positions marked 8. The dotted circles 22 in the Figure show only the approximate position where the four rings containing heating elements extend through the baffle. The baffle is attached to return tube 6 that encloses gas flow path 5. Adjustment of the size of the slots 21 can be used as a control feature to tailor the design to particular gas flow volumes, compositions, and processes.

Figure 3:
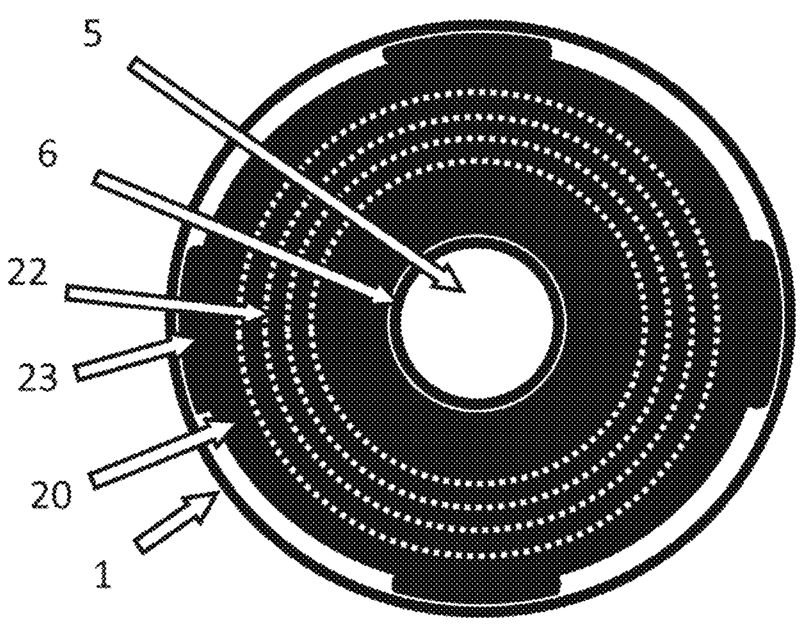
FIG. 3 depicts a schematic, top-down view of another type of 'outside flow' baffle 20 that may be incorporated into a reactor according to an exemplary embodiment of the present invention.

FIG. 3 depicts a schematic, top-down view of another type of 'outside flow' baffle 20 used in one embodiment of the inventive reactor. The baffle 20 is a thin, solid sheet that includes attachment tabs 23 to attach the baffle to the external cylindrical shell 1, and heating elements 8 arranged in concentric rings 22 that extend to or through the baffle. The dotted circles 22 in the Figure show only the approximate position of the four rings containing heating elements 8. The tabs 23 attached to baffle 20 extend only partially around the baffle, and most of the edge of baffle 20 does not contact cylindrical shell 1, to permit the flow of gases around the baffle and up through the cylindrical reaction plenum 4. The baffle is attached to internal return tube 6 that encloses gas flow path 5. Adjustment of the size of the gap between the external shell 1 and the edge of baffle 20 can be used as a control feature to tailor the design to particular gas flow volumes, compositions, and processes.

Figure 4:
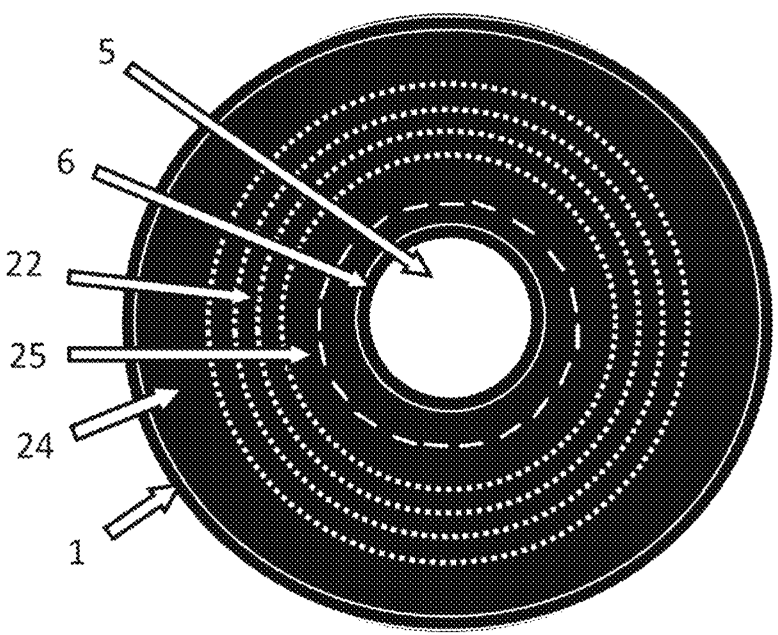
FIG. 4 depicts a schematic, top-down view of an 'inside flow' baffle 24 that may be incorporated into a reactor according to an exemplary embodiment of the present invention.

FIG. 4 depicts a schematic, top-down view of an 'inside flow' baffle 24 used in one embodiment of the inventive reactor. The baffle 24 is a thin, solid sheet that includes slots 25 to allow the flow of gases through the baffle from the entrance of the reactor to the exit up through the cylindrical reaction plenum 4, and heating elements 8 arranged in concentric rings 22 that extend to or through the baffle. The dotted circles 22 in the Figure show only the approximate position where the four rings containing heating elements extend through the baffle. The baffle is attached to external cylindrical shell 1. Adjustment of the size of the slots 25 can be used as a control feature to tailor the design to particular gas flow volumes, compositions, and processes.

Figure 5:
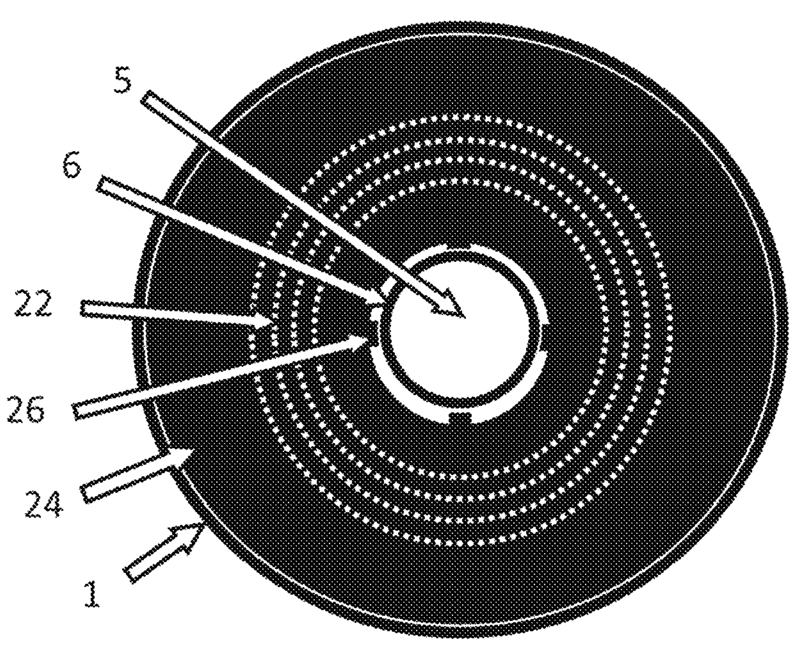
FIG. 5 depicts a schematic, top-down view of another type of 'inside flow' baffle 24 that may be incorporated into a reactor according to an exemplary embodiment of the present invention.
Figure 6:
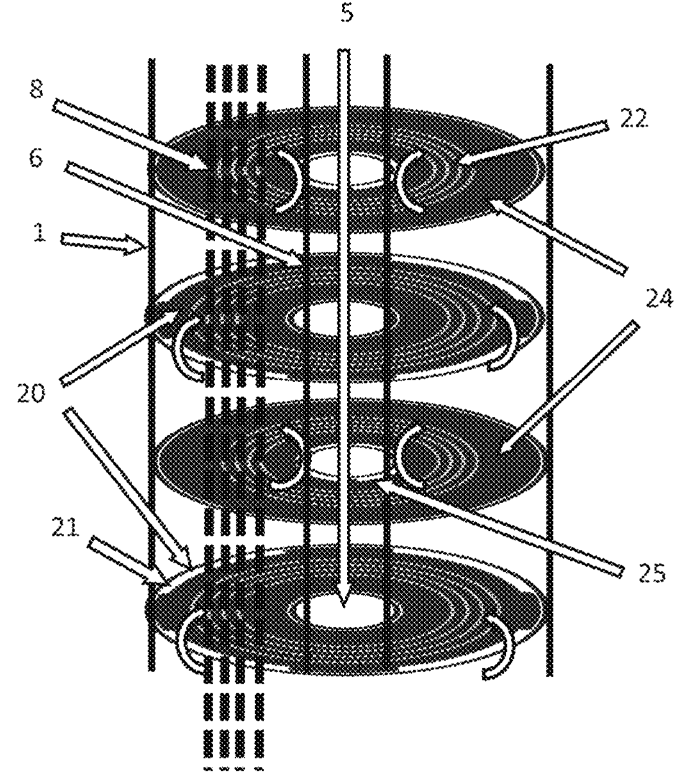
FIG. 6 depicts a schematic side view of a reactor according to an exemplary embodiment of the present invention, showing alternating 'internal' and 'external' baffles.

FIG. 5 depicts a schematic, top-down view of another type of 'inside flow' baffle 24 used in one embodiment of the inventive reactor. The baffle 24 is a thin, solid sheet that includes tabs 26 to attach the baffle to the internal return tube 6, and heating elements 8 arranged in concentric rings 22 that extend to or through the baffle. The dotted circles 22 in the Figure show only the approximate position of where the four rings containing heating elements extend through the baffle. The attachment tabs 26 attached to baffle 24 extend only partially around the baffle, and most of the edge of baffle 24 does not contact internal return tube 6, to permit the flow of gases around the baffle and up through the cylindrical reaction plenum 4. The baffle is attached to external cylindrical shell 1 that encloses the reactor. Adjustment of the size of the gap between the internal cylindrical shell 6 and the edge of baffle 24 can be used as a control feature to tailor the design to particular gas flow volumes, compositions, and processes FIG. 6 depicts a schematic side view of an embodiment of the reactor design of one embodiment of this invention, showing the alternating of 'internal flow' and 'external flow' baffles. External flow baffles 20 alternate with internal flow baffles 24 along the length of the reactor. The external flow baffles 20 have free flow areas 21 toward the outer edge of the baffles 20. The internal flow baffles 24, have slots 25 that define the free flow path toward the inner edge of the baffles 24. Both types of baffles abut and are connected to internal return tube 6. In this diagram the flow of gas through internal gas flow path 5 is shown to be down-flow, counter to the flow of gas in the cylindrical plenum 4, which flows generally upwards. Heating elements 8 arranged in circular rings 22 pass through both external and internal flow baffles.

FIG. 7A depicts a schematic of an arrangement of elements in a portion of several rings within the reactor. FIG. 7B depicts another schematic of the arrangement of FIG. 7A. In FIG. 7A, the arrangement of succeeding rings is shown to be 'staggered' with respect to the prior ring, i.e. each element in a ring further from the center, e.g. Ring b is positioned midway between two elements in a ring closer to the center, e.g. Ring a, and this pattern repeats with later rings. FIG. 7A shows that, for each successive ring containing the same number of elements or elements and metal cylinders, or elements and return tubes, the distance between any two elements in a specific ring becomes larger for rings of a larger diameter that are further from the axis of the device. Thus, as shown in FIG. 7(B), $L_{c\text{-}c}>L_{b\text{-}b}>L_{a\text{-}a}$. FIG. 7A also shows that elements in alternating rings, e.g. rings a and c, or rings b and d, are positioned on a radius that extends from the axis of the device. In this way elements in alternate rings prohibit the fluid from traversing a linear path along the axis either away from, or towards the device axis, forcing the fluid to deflect around the heating elements or blanks or return tubes as the fluid flows in a crossflow manner. This pattern increases the turbulence in the fluid and enhances heat transfer from the heating elements to the fluid. Further, the dead zones or short circuit flow paths inside the reactor are substantially reduced or eliminated.

FIGS. 8A, 8B, and 8C depict geometries between elements of successive rings as the ring diameter D becomes larger and the distance between two elements of the same ring L(n-n) becomes greater from FIG. 8A to FIG. 8B to FIG. 8C. In these Figures, the difference between the radii of two adjacent rings, [D(n)−D(n−1)], becomes smaller as the rings become larger in order to keep the shortest distance between elements on adjacent rings, L(a-a), the same throughout the device. The distance L(a-a) is the closest approach between two elements, so this distance controls the Reynolds number, pressure drop, and turbulence in the fluid, and thus the heat transfer between the heating elements and the fluid.

FIG. 9 depicts a schematic side view of one embodiment of the reactor design of this invention that includes metal cylinders. An external cylindrical shell 1 contains an inlet plenum 2 and a cylindrical outlet plenum 3 attached to the bottom of shell 1. A cylindrical reaction plenum 4 in fluid communication with first annular plenum 2 surrounds an internal cylindrical return tube 6 that is in fluid communication with outlet plenum 3 and outlet conduit 11. Cylindrical reaction plenum 4 is in fluid communication with return tube 6. Cylindrical reaction plenum 4 comprises baffles 7 that direct the reacting gases to contact heating elements 8 in a crossflow pattern to maximize turbulence and heat transfer. The baffles 7 are arranged in an alternating pattern of 'outside flow' and 'inside flow' baffles in the cylindrical reaction plenum 4 to provide plug flow and enhanced radial mixing as the gas passes in a sinusoidal fashion up through plenum 4. The reactor is fitted with electrical heating elements 8 that extend through the top of the reactor 9 and through one or more of the baffles. The reactor is fitted with heat sink cylinders 12 that provide support and improve heat transfer to the reacting gases. In some embodiments the heat sink cylinders 12 and heating elements 8 are interspersed. An inlet conduit 10 in fluid communication with first annular plenum 2, and an outlet conduit 11 in fluid communication with outlet plenum 3, are attached to the vessel to facilitate the flow of the reactants and products, respectively. The reactor defines a process flow through inlet conduit 10, inlet plenum 2, reaction plenum 4, return tube 6, outlet plenum 3, and outlet conduit 11. The reactor is housed within a reaction vessel comprising an external cylinder 14 and a flange 15 and insulating material 13 that envelopes the cylindrical shell and the reactor vessel. The reaction vessel may optionally be attached to an attachment flange 16 to form a single unit. Optionally, thermal shield 17 can be positioned above attachment flange 16.

FIGS. 10A and 10B show an arrangement of the heating elements 8 and metal cylinders 12 in the region of the top baffle of the reactor. The heating elements 8 extend through the top baffle (as shown in FIG. 10A) and out of the vessel (as shown in FIG. 10B) to a position above the device, whereas the metal cylinders 12 terminate where they join the top baffle (as shown in FIG. 10A), or in some cases one or more metal cylinders can join attachment flange 16. The termination of the heating elements is at a point above the vessel where the temperature is less than about 150° C. where connections can be made.

Figure 11:
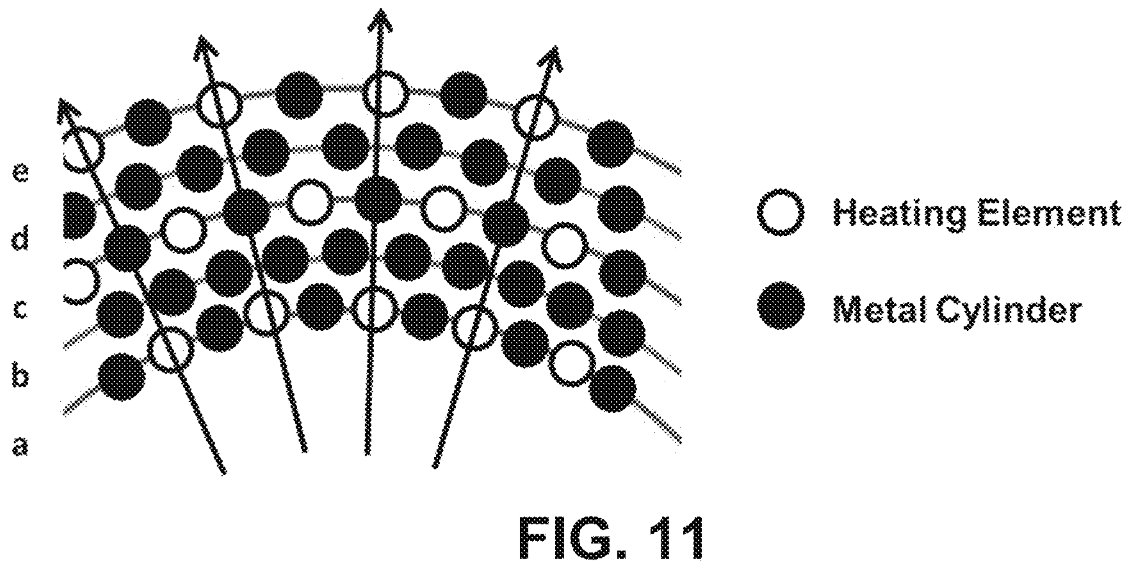
FIG. 11 depicts a possible arrangement of heating elements and metal cylinders in a reactor according to an exemplary embodiment of the present invention.

FIG. 11 depicts one possible arrangement of elements 8 and metal heat sink cylinders 12 in the reactors of this invention. In FIG. 11 heating elements 8 are placed in alternating rows, i.e. rows a, c, and e, around the axis of the reactor. Within rows a, c, and e, heating elements 8 alternate with metal cylinders 12. Rows that contain heating elements alternate in their placement of the heating elements such that the heating elements in the outer row of the pair, e.g. row c, are not on a radial line from the center that passes through the heating elements of the inner row of the pair, e.g. row a. This ensures that every heating element has a metal heat sink cylinder on the straight radial line between each heating element in a first row, e.g. row a, and the heating elements in the next row that contains heating elements, e.g. row c, as well as between each heating element in that first row, e.g. row a, and the heating elements in the following row after that first row that contains heating elements, e.g. row e. Rows b and d comprise only metal heat sink cylinders 12.

Figure 12:
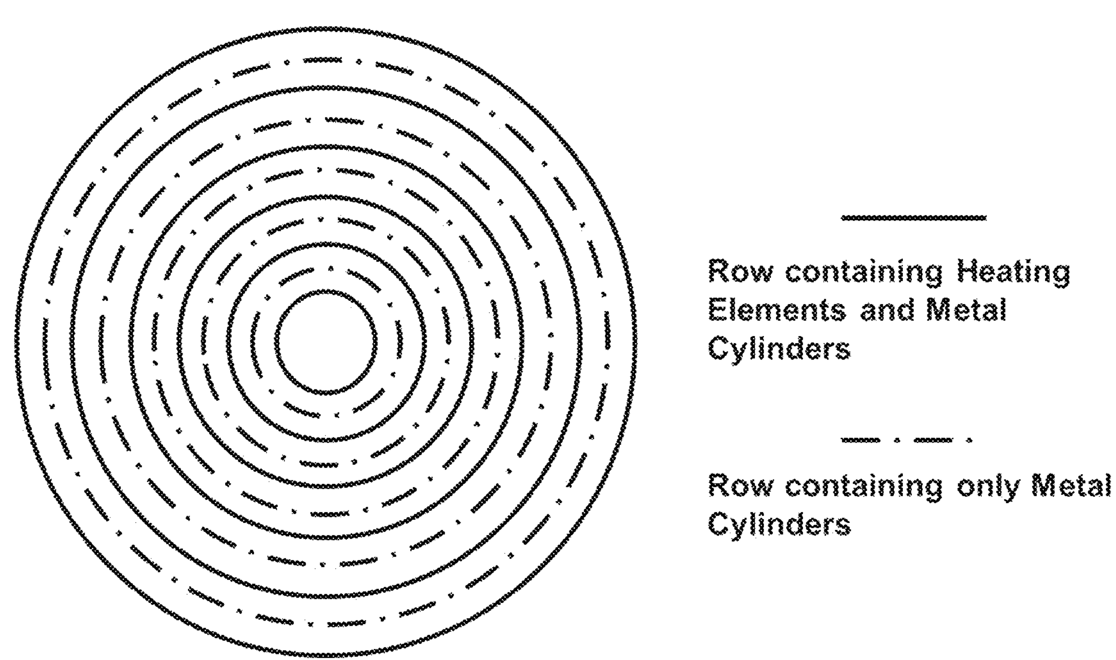
FIG. 12 shows a reactor according to an exemplary embodiment of the present invention, showing details of an arrangement of heating elements and metal cylinders in the reactor.

FIG. 12 shows one embodiment of the reactor showing the arrangement of the rows containing both heating elements and metal heat sink cylinders, and rows containing only metal heat sink cylinders. In this arrangement the two types of rows are alternating.

Figure 13:
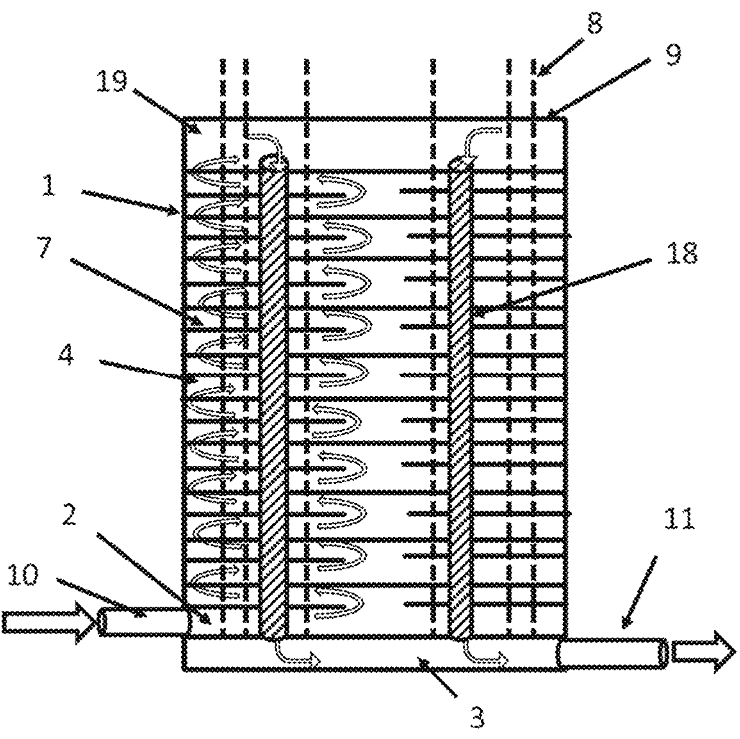
FIG. 13 shows a reactor according to an exemplary embodiment of the present invention that includes return tubes interspersed with heating elements.

FIG. 13 is a schematic side view representation of another embodiment of the reactor showing the reactor shell 1, baffles 7, heating elements 8, inlet conduit 10, inlet plenum 2, reaction plenum 4, outlet plenum 3, and outlet conduit 11. The baffles 7 are arranged in an alternating pattern of 'outside flow' and 'inside flow' baffles in the cylindrical reaction plenum 4 to provide plug flow and enhanced radial mixing as the gas passes in a sinusoidal fashion up through plenum 4. In this embodiment the reacted gases collect in collection zone 19 and are passed to outlet plenum 3 via one or more return tubes 18 that are arranged in rings about the central axis, either as separate rings or interspersed with heating elements. The return tubes can be positioned to replace one or more of the metal heat sink cylinders 12 shown in FIG. 9, 10, 11, or 12. The flow pattern in this embodiment has gas moving along a path from inlet conduit 10 through inlet plenum 2, up through reaction plenum 4, across baffles 7, passing between and among heating elements 8 and return tubes 18, reaching collection zone 19, passing into return tube or tubes 18, into outlet plenum 3, and outlet conduit 11. Heating elements 8 may optionally extend into inlet plenum 2. Outlet tubes 18 are in fluid communication with outlet plenum 3.

Figure 14:
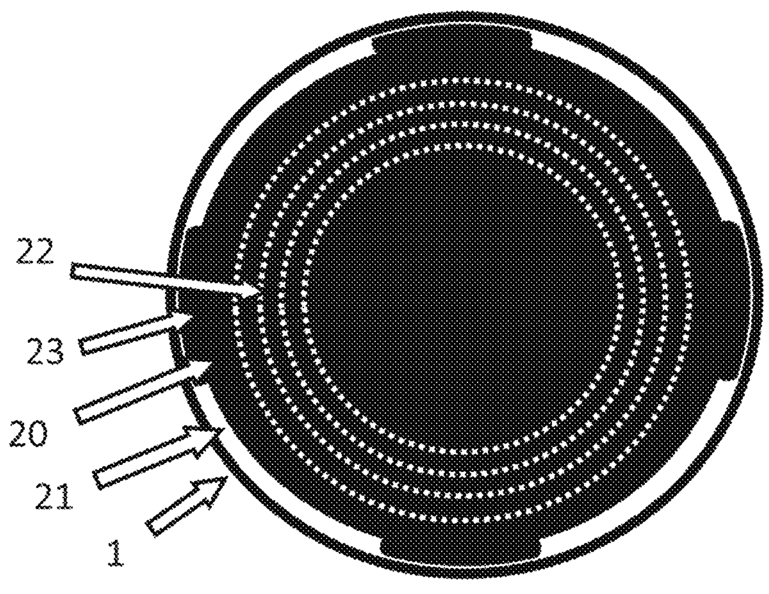
FIG. 14 depicts a schematic, top-down view of one type of 'outside flow' baffle 20 used in the reactor of FIG. 13.

FIG. 14 depicts a schematic, top-down view of one type of 'outside flow' baffle 20 used in an embodiment of the inventive reactor as depicted in FIG. 13. The baffle 20 is a thin, solid sheet that includes slots 21 that define a free flow area to permit the flow of gases through the baffle from the entrance of the reactor up through the cylindrical reaction plenum 4 on its path to the outlet. Heating elements, return tubes, or some combination of heating elements, heat sink cylinders, and return tubes extend to or through the baffle at positions arranged in concentric rings 22. The dotted circles 22 in the Figure show only the approximate position where the one or more rings containing heating elements, heat sink cylinders, or return tubes, or some combination thereof, extend through the baffle. Adjustment of the size of the slots 21 can be used as a control feature to tailor the design to gas flow volumes, compositions, and processes. Metal tabs 23 attach the baffle to the cylindrical shell 1.

Figure 15:
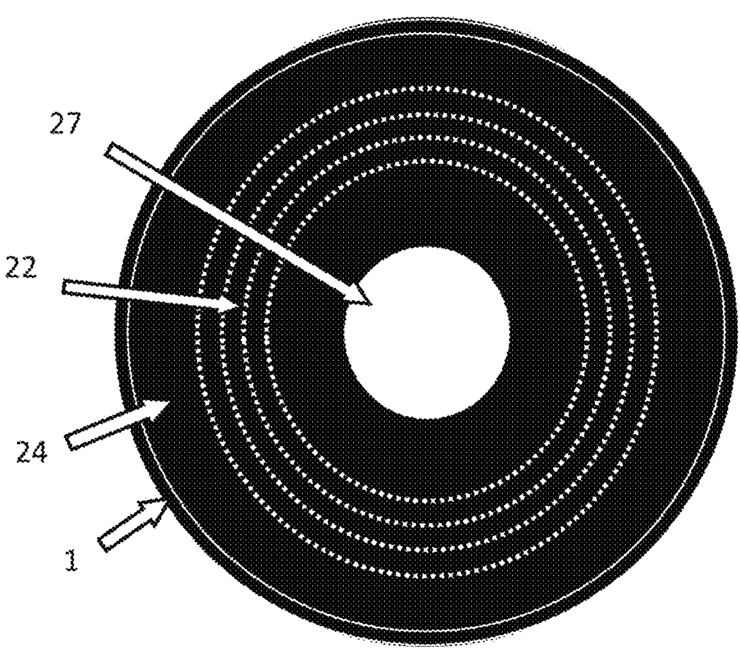
FIG. 15 depicts the salient points of a schematic, top-down view of another type of 'inside flow' baffle used in a reactor according to an exemplary embodiment of the present invention.

FIG. 15 depicts the salient points of a schematic, top-down view of another type of 'inside flow' baffle 24 used in an embodiment of the inventive reactor. The baffle 24 is a thin, solid sheet with heating elements, or heating elements, heat sink cylinders, and return tubes, arranged in concentric rings 22 that extend to or through the baffle. The dotted circles 22 in the Figure show only the approximate position of where the rings containing heating elements extend through the baffle. The baffle is attached to external cylindrical shell 1 that encloses the reactor. Adjustment of the size of the open region 27 at the center of the baffle, that permits gas to move up through the baffle, can be used as a control feature to tailor the design to particular gas flow volumes, compositions, and processes.

In some embodiments the gas feed to the reactor for the production of hydrogen or mixtures of hydrogen and carbon monoxide can comprise any mixture of hydrocarbonaceous materials such as methane, ethane, C2-C4 hydrocarbons or olefins, naphtha, light oxygenates, carbon monoxide, carbon dioxide, water, hydrogen, and other minor components such as aromatics, H2S, SO2, SO3, NH3, or a mixture of any of these. Typical gas mixtures that can be used for the feed to produce synthesis gas can include biogas, anaerobic digestion gas, landfill gas, natural gas, renewable natural gas, pyrolysis gas (pygas), or product gases from pyrolysis or catalytic pyrolysis or other processes, or a mixture thereof. Preferably the feed gas mixture for application to the production of hydrogen or hydrogen and carbon monoxide mixtures contains less than 50, or less than 30, or less than 20, or less than 10, or from 0.5 to 50, or from 1.0 to 30, or from 2.0 to 20 percent methane by volume, less than 10, or less than 5, or less than 2, or from 0.01 to 10, or from 0.02 to 5, or from 0.03 to 2 percent by volume of light hydrocarbons containing 2 or more carbon atoms, at least 1, or at least 5, or at least 10 or at least 20, or from 1 to 50, or from 5 to 40, or from 10 to 30 percent by volume water, wherein the steam to carbon ratio is at least 1, or at least 2, or at least 3, or from 1 to 10, or from 2 to 8, or from 3 to 5, wherein the carbon includes all carbons in light hydrocarbons, oxygenates, and olefins, less than 50, or less than 30, or less than 20, or less than 10, or from 0.01 to 50, or from 0.1 to 30, or from 0.5 to 20 or from 1 to 10 percent by volume carbon dioxide, or less than 50, or less than 20, or less than 20, or less than 5, or from 0.01 to 50, or from 0.1 to 20, or from 0.5 to 10 or from 1 to 5 percent by volume carbon monoxide, and less than 60, or less than 40, or less than 20, or less than 10, or less than 5, or from 0.01 to 60, or from 0.1 to 40, or from 0.5 to 20 or from 1 to 10 percent by volume hydrogen, or any mixture of these.

The reactor of the present invention can also be used for the thermochemical conversion of light gas mixtures to olefins, such as dehydrogenation of ethane to ethylene, or dehydrogenation of naphtha to light olefins, or dehydrogenation of ethyl benzene to styrene, or similar gas phase thermal chemical conversions.

In some embodiments the external cylindrical shell of the vessel can have a diameter of at least 1 foot (30 cm), or at least 3 feet (90 cm), or at least 5 feet (150 cm), or at least 8 feet (240 cm), or from 1 to 30 feet (30 to 900 cm), or from 3 to 20 feet (90 to 600 cm), or from 5 to 12 feet (150 to 360 cm), and a length of at least 5 feet (150 cm), or at least 8 feet (240 cm), or at least 11 feet (330 cm), or no more than 15 feet (450 cm), or no more than 10 feet (300 cm), or no more than 8 feet (240 cm). In some embodiments the length of the cylindrical shell can exceed the length of the one or more return tubes by at least 2 in (5 cm), or at least 4 in (10 cm), or at least 8 in (20 cm), or at least 12 in (30 cm), or from 2 to 60 in (5 to 150 cm), or 4 to 12 in (10 to 30 cm).

In some embodiments the one or more return tubes are of a suitable length to extend from at least the position of the baffle at the highest point in the reactor to a point at or beyond the bottom of the reaction zone allowing the product gas to flow into the cylindrical outlet plenum that allows the gas to flow into the outlet conduit. The arrangement also allows heat exchange between the fluid within the return tubes and fluid within the reaction zone, so that the reactor provides heat recuperation. The diameter of the one or more return tubes can be at least 0.5 in (1.25 cm), or at least 1.0 in (2.5 cm), or at least 2 in (5 cm) or at least 5 in (12.5 cm), or at least 12 in (30 cm) in diameter, or from 0.5 in (1.25 cm) to 60 in (180 cm), or 0.75 in (1.9 cm) to 24 in (60 cm), or 1.0 in (2.5 cm) to 12 in (30 cm), or no more than 5 in (12.5 cm) or no more than 2 in (5.0 cm), or no more than 1 in (2.5 cm), or no more than 0.75 in (1.9 cm) in diameter. The return tubes may be made of any metal or ceramic that can withstand the temperature and conditions within the reactor, such as Ni containing high temperature alloys like alloy 800

(UNS N08800) and its variants 800H (UNS N08810) and 800HT (UNS N08811), alloy 825 (UNS N08825), alloy 617 (UNS N06617)HR-160 (N12160), Nitinol alloy (UNS N01555), Alloy 330 (UNS N08330), or similar alloys that are suitable for use at 1373 K and steam containing gases. Preferably the internals of the reactor, including the shell, baffles, return tubes, and inlet and outlet plena, are all made from the same material.

In some embodiments the baffles can be sheets of a metal alloy that are at least 0.125 in (0.3175 cm), or 0.25 in (0.6350 cm), or 0.5 in (1.25 cm), or 1.0 in (2.5 cm), or 1.5 in (3.75 cm), or 2.0 in (5 cm) or 3 in (7.5 cm), or 4 in (10 cm) thick, or are from 0.25 in (0.6350 cm) to 6 in (15 cm), or from 1.0 in (2.5 cm) to 4.0 in (10 cm) thick, or no more than 4.0 in (10 cm), or no more than 2.0 in (5 cm), or no more than 1.0 in (2.5 cm), or no more than 0.5 in (1.25 cm) thick. The baffles that are fitted within the cylindrical reaction plenum or those that are fitted within a return tube include an open portion that is at least 0.1%, or at least 0.5%, at least 1%, or at least 2%, or at least 3%, or from 0.01% to 5%, or from 0.1% to 2%, or no more than 10%, or no more than 3%, or no more than 1%, or no more than 0.5% of the cross sectional area of the cylindrical reaction plenum or the cross sectional area of the return tube. The baffles within the cylindrical reaction plenum or the return tubes contain openings for each of the heating elements that pass through the baffle with a clearance of at least 0.001 in (0.0025 cm), or at least 0.01 in (0.025 cm), or at least 0.016 in (0.041 cm), or from 0.001 to 0.1 in (0.0025 to 0.25 cm), or no more than 0.02 in (0.05 cm), or no more than 0.16 in (0.041 cm) between the heating element and the baffle. In some embodiment the baffles are separated by at least 1 inch (2.5 cm), or at least 2 inches (5.0 cm), or at least 4 inches (10 cm), or at least 6 inches (15 cm), or at least 8 inches (20 cm), or at least 12 inches (30 cm), or at least 18 inches (45 cm), or from 1 to 24 inches (2.5 to 60 cm), or from 2 to 18 inches (5 to 45 cm), or from 4 to 12 inches 10 to 30 cm) from each other. In some embodiments the reactor comprises at least 4, or at least 10, or at least 20 or at least 30 baffles, or from 2 to 60, or from 4 to 30 baffles.

In some embodiments the arrangement of baffles within the cylindrical reaction plenum or one or more return tubes or both may comprise a pattern wherein no two baffles that are next to each other have the same arrangement of openings within the two baffles. Preferably the baffles are arranged such that baffles with the openings through the baffles at different positions alternate with each other, i.e. any baffle with the through opening near the center of the cylindrical reaction plenum alternates with a baffle with the through opening nearer the circumference of the baffle, and this pattern of alternating baffles continues through the length of the cylindrical reaction plenum. The arrangement of baffles preferably causes the gas to flow in opposite directions from one baffle to the next with respect to the radius of the cylindrical reaction plenum, i.e. gas flows in an outward radial direction in one baffle and flows in an inward radial direction in the next baffle, and this pattern repeats throughout the cylindrical reaction plenum.

In some embodiments the arrangement of the elements, i.e. heating elements or return tubes or heat sink cylinders, or some combination thereof, within the cylindrical reaction plenum comprises one or more concentric rings where each ring is coaxial with the cylindrical reaction plenum. In some embodiments the number of rings of elements within the reaction plenum or within any one of the one more return tubes can be 1, or 2, or 4, or 6, or 8, or 9, or 11, or at least 2, or at least 4, or at least 8, or no more than 20, or no more than 12 rings. The rings containing heating elements may comprise heat sink cylinders or return tubes or both that are interspersed with the heating elements in any pattern, but preferably such that no two heating elements are next to each other. The number of heat sink cylinders or return tubes or some combination thereof in any ring may be equal to the number of heating elements or may be more than or less than the number of heating elements. The diameter of the rings containing heating elements or return tubes or heat sink cylinders, or some combination thereof can be at least 5%, or at least 10%, or at least 15%, or from 5% to 95%, or from 10% to 90%, or from 15% to 95% of the diameter of a baffle within the cylindrical reaction plenum. Rings without heating elements are disposed in the cylindrical reaction plenum in concentric rings that alternate with rings comprising heating elements or can be placed next to each other. Heating elements may optionally be placed within a return tube or tubes. For reactors where a single return tube is utilized there may be rings containing heating elements within the return tube. Rings within return tubes containing heating elements may contain heat sink cylinders in addition to heating elements. These rings may be any size that fits within the one or more return tube or tubes and one or more heating element may be placed within a return tube.

In some embodiments the arrangement of elements in each succeeding ring, i.e. further from the axis, is 'staggered' with respect to the prior ring, such that each element in a ring further from the center is positioned midway between two elements in a ring closer to the center, and this pattern repeats with later rings. For each successive ring containing the same number of elements, i.e. heating elements plus metal cylinders plus return tubes, the distance between any two elements in a specific ring becomes larger for rings of a larger diameter that are further from the axis of the device. The distance between any two elements in a ring may be at least 0.3 in (0.76 cm), or at least 0.5 in (1.27 cm), or at least 0.65 in (1.65 cm), or at least 0.85 in (2.16 cm), or from 0.3 in (0.76 cm) to 2.0 in (5 cm) or from 0.5 in (1.25 cm) to 1.5 in (3.75 cm), or from 0.65 in (1.65 cm) to 1.0 in (2.54 cm), or no more than 2.0 in (5 cm), or no more than 1.5 in (3.75 cm), or no more than 1.25 in (3.175 cm). The closest distance between an element, i.e. heating element or heat sink cylinder or return tube, in one ring and an element in the adjacent ring may be at least 0.3 in (0.76 cm), or at least 0.5 in (1.27 cm), or at least 0.65 in (1.65 cm), or at least 0.85 in (2.16 cm), or from 0.3 in (0.76 cm) to 2.0 in (5 cm) or from 0.5 in (1.25 cm) to 1.2 in (3.05 cm), or from 0.65 in (1.65 cm) to 1.0 in (2.54 cm), or no more than 1.5 in (3.75 cm), or no more than 1.25 in (3.175 cm), or no more than 1.0 in (2.54 cm), or no more than 0.85 in (2.16 cm). In some embodiments the closest distance between elements of adjacent rings may be the same for any two adjacent rings or this distance may be different for different pairs of adjacent rings. In some embodiments the reactor may comprise one element (sum of heating elements plus return tubes plus heat sink cylinders), or at least 24, or at least 48, or at least 96, or at least 192, or at least 384, or at least 768 elements, or no more than 1200, or no more than 1000 elements. In some embodiments the number of elements (sum of heating elements plus return tubes plus heat sink cylinders), situated in a single ring coaxial with the reaction plenum may be at least 4, or at least 8, or at least 16, or at least 32, or at least 48, or at least 64, or at least 80, or no more than 144, or no more than 80, or no more than 64, or no more than 48 elements.

In some embodiments the reaction vessel may be insulated with ceramic insulation on the exterior of the device, or insulation may be installed within the reactor shell, or both. In the case where insulation is contained within the reaction vessel, the interior surface of the insulation may be considered as the external wall of the cylindrical reaction plenum for the purposes of designating the position of baffles, heating elements, heat sink cylinders, return tubes, or any other fixture within the cylindrical reaction vessel.

In some embodiments thermocouples or other sensing devices may be placed anywhere within or on the exterior of the cylindrical reaction vessel. In some embodiments one or more heating elements may comprise thermocouples within their structure. Other sensing devices could comprise optical sensors or pressure sensors that could be placed anywhere within the cylindrical reaction vessel, or adjacent to the device, or within the feed or outlet conduits.

In some embodiments the heating elements may be controlled by turning on or off the energy supplied to them or by adjusting the rate of energy flowing to them, i.e. the form of a curve of the energy supply versus time may follow a square wave or a curved, e.g. sinusoidal, wave. The control may be performed on individual heating elements or preferably may be conducted by controlling groups of heating elements, or portions thereof, together. The groups of heating elements that are controlled together may comprise heating elements in a single ring or heating elements within more than one ring. Each heating element may be controlled in part, i.e. over a section of their length, or for the entire length of the heating element. Any group of heating elements or sections of heating elements may be controlled together. There may be one control group or many control groups. The heating elements may be controlled by adjusting their state (on, off, partial energy) in response to temperature or temperatures, or pressure or pressures, or optical properties, or product composition, or some combination thereof. Product composition can be monitored by gas chromatography, by infrared, UV, or visible absorption, by thermal conductivity, by mass spectrometry, or by other means known to those skilled in the art.

The reactor of this invention comprises a lid or cap that encloses the top of the reactor across the breadth of the reactor shell and seals the reactor shell from the exterior environment.

In some embodiments the reactor may be designed for operation at pressures above atmospheric pressure. In these embodiments the reactor may be contained in a pressure shell, or the cylindrical shell of the device may be suitable for operation at pressure by adjusting the thickness of the shell, the flange, and attachment flange, or providing mechanical support structures such as one or more hoops or rings that encircle the reactor shell, or some combination of these. Any added support hoops or rings may be spaced along the length of the shell. In embodiments wherein the reactor is contained in a pressure shell, the space between the reactor and the pressure shell may be filled with an inert fluid such as nitrogen, argon, or other inert material. In some embodiments where a pressure shell is used the space between the reactor shell and the pressure shell is at least partially filled with insulation. An advantage of placing the reactor in a pressure shell is that the components of the reactor may be less massive, containing less expensive alloy, and the pressure shell may be made from less expensive metals or alloys, thus reducing cost and mass of the reactor. In other embodiments the reactor may be designed to operate at pressures less than atmospheric pressure, such as for processes where very short residence times are desired.

For application to non-catalytic steam reforming of hydrocarbon mixtures to synthesis gas the heating elements can be controlled such that the maximum temperature measured in the device is no more than 1323K, or 1353 K, or 1373 K, or 1403 K, or from 1273 K to 1473 K, or from 1353 K to 1403 K, or from 1368 K to 1373 K, or the heating elements can be controlled such that the difference between the temperature measured when the heating elements are turned on and when the heating elements are turned off is less than 50 K, or less than 20 K, or less than 10 K, or from 1 K to 50 K, or from 3 K to 20 K, or from 5 K to 10 K. For application to catalytic steam reforming of hydrocarbon mixtures to synthesis gas the maximum temperature measured in the device can be no more than 1173 K, or 1123 K, or 1098 K, or 1073 K, or 1053 K, or from 823 K to 1173 K, or from 923 K to 1123 K, or from 973 K to 1098 K, or at least 823 K, or 873 K, or 923 K, or 973 K. For either non-catalytic or catalytic steam reforming of hydrocarbon mixtures to synthesis gas or other processes the pressure may be at least 101 kPa (1 bar), or at least 200 kPa (2 bar), or at least 500 kPa (5 bar), or at least 800 kPa (8 bar), or at least 1500 kPa (15 bar), or from 101 to 5000 kPa (1 to 50 bar), or from 500 to 2500 kPa (5 to 25 bar).

In embodiments wherein steam reforming is catalyzed within the reactor the catalyst may comprise nickel. In some embodiments the nickel may be derived from the alloy that forms the baffles, cylindrical shell, cylindrical return tubes, or heating element sheaths, or any combination of these, or these items may be conditioned to make them catalytically active by the application of catalytic coatings. In some embodiments the catalytic coatings may be prepared by conditioning the surface or surfaces of at least a portion of the metallic components either before or after assembly by heat treatment or other process. In some embodiment the heat treatment may comprise heat treatment with a reacting gas within the reactor, wherein the gas can be air, or steam, or some combination of these, or aluminum trichloride and hydrogen in one step and an oxidizing gas in a second step, to form a surface layer that is more resistant to coking or corrosion or can support catalytically active metals. In some embodiments the metallic components may be coated, either after heat treatment or without first heat treating them, with a metal oxide material that serves as the support for the catalytic components. The metal oxide coating materials may be oxides of zirconium, cerium, aluminum, silicon, magnesium, rare earths (lanthanides—elements 57 through 71 of the Periodic Table—scandium, and yttrium), or some combination of these.

Another embodiment of the invention is a reaction system for converting energy to, or storing energy as, hydrogen or hydrogen and carbon monoxide, by reacting light hydrocarbon gases with steam, carbon dioxide, or some combination thereof, in a device of the invention wherein the electrical energy used in the process is produced by photovoltaic cells, or wind energy, or tidal forces, or nuclear energy, or combustion of non-fossil biomaterials or wastes, or other energy source, or any combination of these sources that does not consume fossil fuels. In some embodiments energy derived from fossil fuels may in part be included in the system. In some embodiments the fraction of energy from fossil fuels being no more than 25%, or no more than 15%, or no more than 10%, or no more than 5% of the total energy provided to the system. In some embodiments the feed gas for the steam reforming process may be at least in part derived from gas recovered from anaerobic digestion, fermentation, pyrolysis of non-fossil biomaterials or wastes, or natural gas, or landfill gas, or waste gases from chemical processes, or any combination thereof.

In some embodiments of this invention the process conducted in the reactor can be steam cracking of a gas mixture comprising ethane, or ethane and propane, or a mixture of light hydrocarbons (C2-C4), to produce ethylene or mixtures of ethylene and other olefins, and hydrogen. In these embodiments the maximum temperature measured in the device can be no more than 1153 K, or 1123 K, or 1103 K, or 1073 K, or from 1023 K to 1223 K, or from 1073 K to 1173 K, or from 1103 K to 1153 K, or at least 1023 K, or 1053 K, or 1073 K, or 1103 K. In these embodiments the pressure of the reactor may be no more than 200 kPa (2 bar), or no more than 101 kPa (1 bar), or no more than 50 kPa (0.5 bar), or no more than 25 kPa (0.25 bar), or from 1 to 200 kPa (0.01 to 2 bar), or from 5 to 101 kPa (0.05 to 1 bar), or from 10 to 50 kPa (0.1 to 0.5 bar).

In some embodiments the reactor may be operated in the reverse direction than that described above, i.e. the feed gas may be fed to the outlet conduit and the product gas may exit the feed conduit such that the flow of gases is reversed.

EXAMPLES

The effectiveness of the reactor designs of this invention were evaluated by conducting computational fluid dynamic (CFD) calculations with various configurations and process parameters.

The CFD was conducted as a 3D, pseudo transient, single phase simulation, with conjugate heat transfer, with a realizable k-epsilon turbulence model. A radiation discrete ordinate (DO) model is used for radiative heat transfer. The heating elements were modeled as solid zones with fixed volumetric heat availability. In the comparative example and Examples 1 and 2 the elements were defined as fixed temperature surfaces with heat supplied as demanded by the heat transfer to the reacting gas. In Examples 3 through 10 the availability of energy from the heating elements was controlled by turning the element on or off depending on the temperature of the heating element surface, in to prevent overheating. The properties of the feed gas were adjusted to reflect the temperature at any specific point within the model. The walls of the reactor were considered to be adiabatic. All metal components were modeled using the material properties of INCOLOY 800 HT.

The kinetics of methane steam reforming were modeled as a first order unimolecular decomposition adapted from published literature ("The Thermal Decomposition of Methane. I. Kinetics of the Primary Decomposition to C2H6+H2; Rate Constant for the Homogeneous Unimolecular Dissociation of Methane and its Pressure Dependence," C.-J. Chen, M. H. Back, *Can. J. Chem,* 53, 1975, 3580-3590), as CH4 decomposition is known to be the rate limiting step in CH4 reactions ("Isotopic and kinetic assessment of the mechanism of reactions of CH4 with CO2 or $H_2O$ to form synthesis gas and carbon on nickel catalysts," J Wei, E Iglesia, *J Catalysis* 224 (2004) 370-383).

Comparative Example

In this example the design of Galloway (U.S. Pat. No. 10,479,680) was evaluated by CFD. The design features 66 heating elements contained in 2 inch (5 cm) diameter sheaths arranged in 4 concentric rings, two rings in an annular region and two rings within a central cylindrical divider. The heating elements were modeled as having a constant temperature on the surface of the sheaths with the heat provided matching that required to maintain the sheath temperature at 1373 K. The walls and sheaths were modified with square profile (0.25×0.25 in) flow disrupters spaced evenly every 2 inches (5 cm) along their length which serve to enhance mixing and heat transfer. A gas diffusion plate was placed at the entry of the reaction zone with 21 slots, 4 inches (10 cm) long and 4.35 int (28 cm 2) of open area. The feed enters a plenum fitted to the bottom of the reaction zone, within which feed gas exchanges heat with the gas that exits from the cylindrical inner core through a serpentine heat exchange tube.

Figure 16:
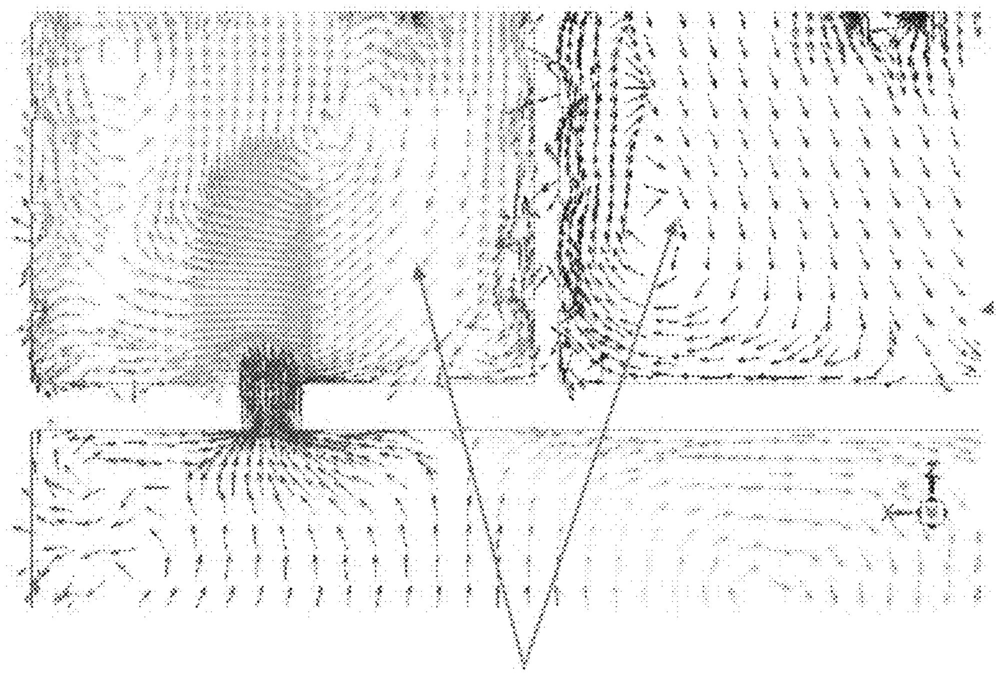
FIG. 16 shows gas flow paths of a Comparative Example as calculated by CFD for a reactor according to an exemplary embodiment of the present invention.
Figure 17:
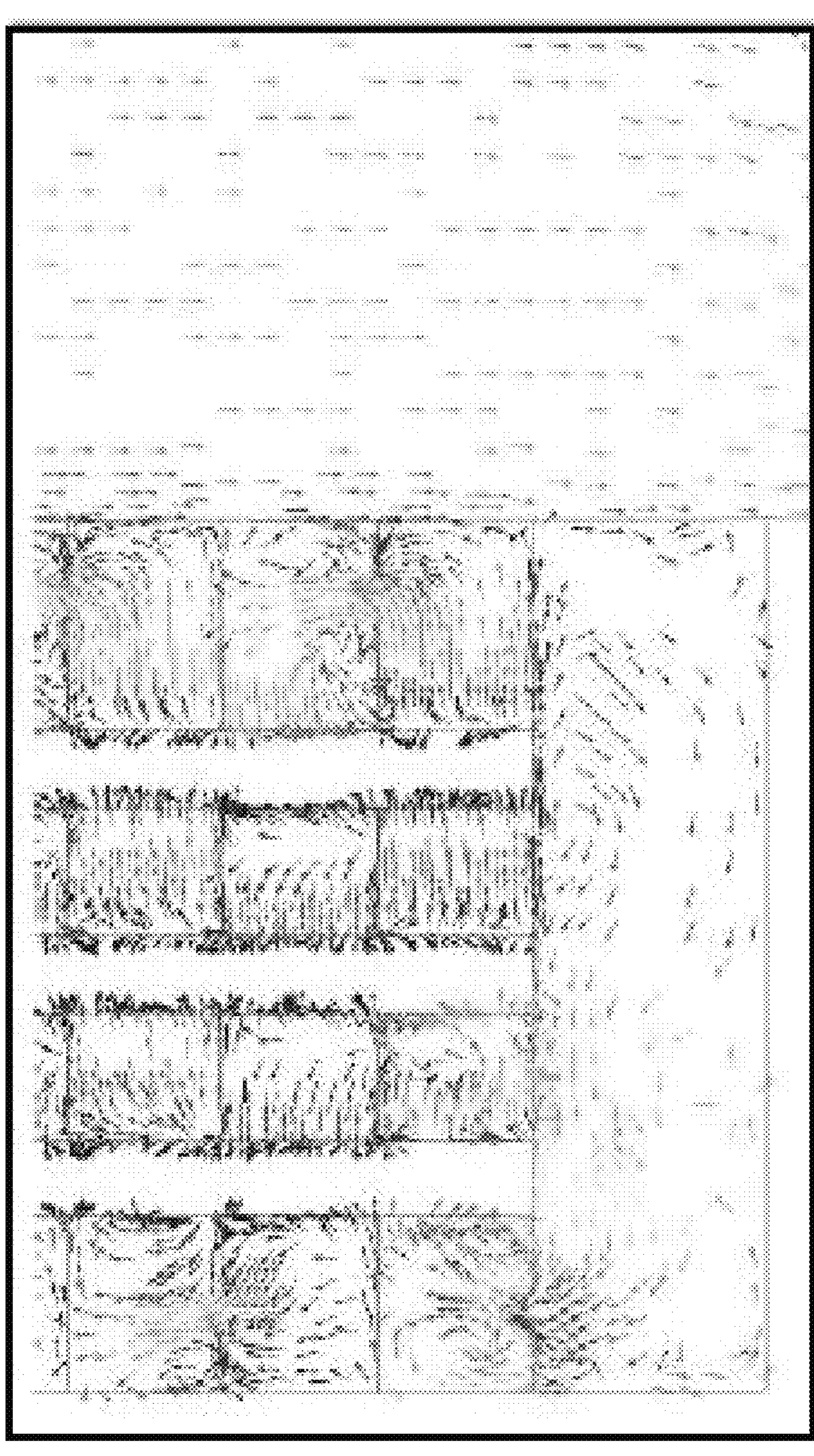
FIG. 17 presents a flow pattern of gases within a reactor according to an exemplary embodiment of the present invention.

The maximum gas temperature calculated by CFD was 1232 K (959 C), the gas exited the reactor at 1197 K, and, assuming the gas was maintained at the maximum temperature for most of its traverse of the reactor, a separate kinetic model calculation showed the homogeneous CH4 conversion to be 3.2%. The streamlines calculated by CFD and shown in FIG. 16 show large recirculation zones near the gas inlet ports, indicating a potential for coking in this region.

Example 1

The reactor design was modified by the addition of 20 baffles perpendicular to the axis of the reactor to enhance heat transfer, and with a cylindrical return tube 18 in (46 cm) OD containing no heating elements, and 192 heating elements arranged in concentric rings of 24, 32, or 40 heating elements within an annular plenum. The geometry is that depicted in FIGS. 1, 2, and 3. The heating elements were modeled as providing as much energy as required to each of the heating elements in the annular region to maintain the surface of the element at 1373 K. Other specific parameters are listed in Table 2.

In this case the gas temperature readily reached 1373 K, the gas outlet temperature was 1365 K, and the methane conversion was calculated in a separate kinetic evaluation to be near 98%, assuming the gas was maintained at the maximum temperature during most of its time within the reactor. This Example shows that the addition of baffles greatly improves the heat transfer and increases the methane conversion.

The flow path lines calculated by CFD for this design showed fewer large recirculation zones, indicating a lower tendency for coking within the reactor.

Example 2

The reactor design was modified to include 208 heating elements arranged in 4 rings of 52 heating elements each, as in FIGS. 1, 2, and 3. Each zone between two baffles was limited to providing a maximum of 13 kW of energy from the heating elements therein, or a total of 278 kW.

The average gas temperature calculated in the CFD was 1203 K, its maximum temperature reached 1295 K, and the maximum temperature of a heating element was 1375 K. In this Example the CH4 conversion was calculated separately as being 3.0%.

Figure 18:
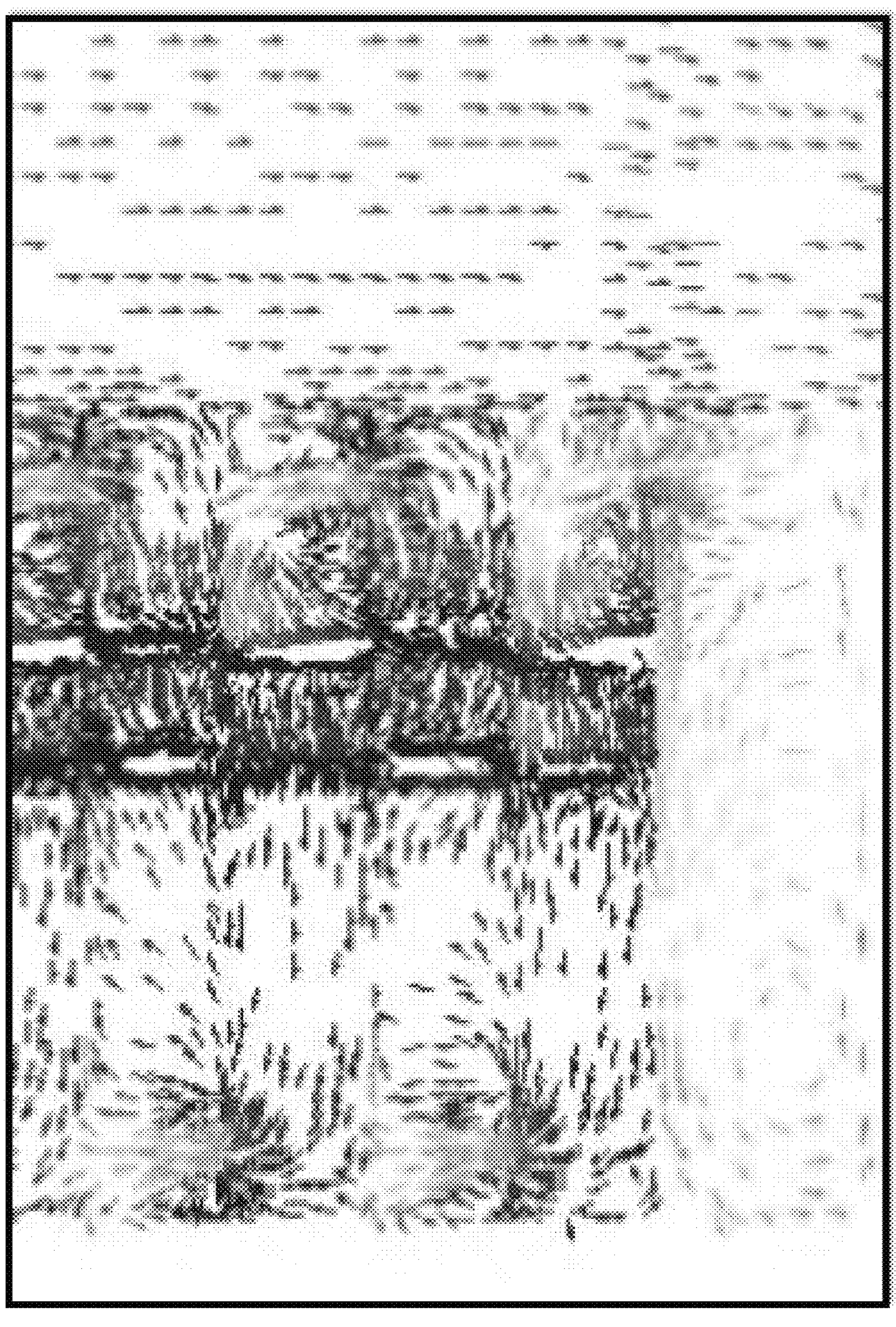
FIG. 18 shows streamlines calculated for a reactor according to an exemplary embodiment of the present invention.

The streamlines calculated in the CFD showed little evidence for recirculation within the reactor volume as shown in FIG. 18.

Example 3

The conditions employed with the reactor design of Example 2 were modified to provide a total of 1209 kW through the heating elements. The outlet gas temperature was increased to 1410 K and the methane conversion was 88%, with 72.4% of the heat delivered transferred to the gas feed in either the form of sensible heat or heat of reaction of methane decomposition. This Example shows that the design that includes baffles can achieve both high methane conversion and efficient heat transfer.

Example 4

The conditions employed with the reactor design of Example 2 were modified by adding a control feature to the heating scheme wherein the heating elements were turned off when their surfaces reached 1373 K, a temperature above which the element life is shortened. Each element has 3 independently controlled heating regions along its length, and each of the rings containing heating elements and solid cylinders was controlled separately, creating 12 separate control groups within the reactor. The heating element control groups were turned off when the element skin temperature was calculated to reach 1373 K, and the element regions were turned on when the temperature decreased to 1323 K.

Additionally, the design allowed for a small gap of 0.0625 inches (0.16 cm) between the element and each baffle through which the element passes.

Figures 19A, 19B:
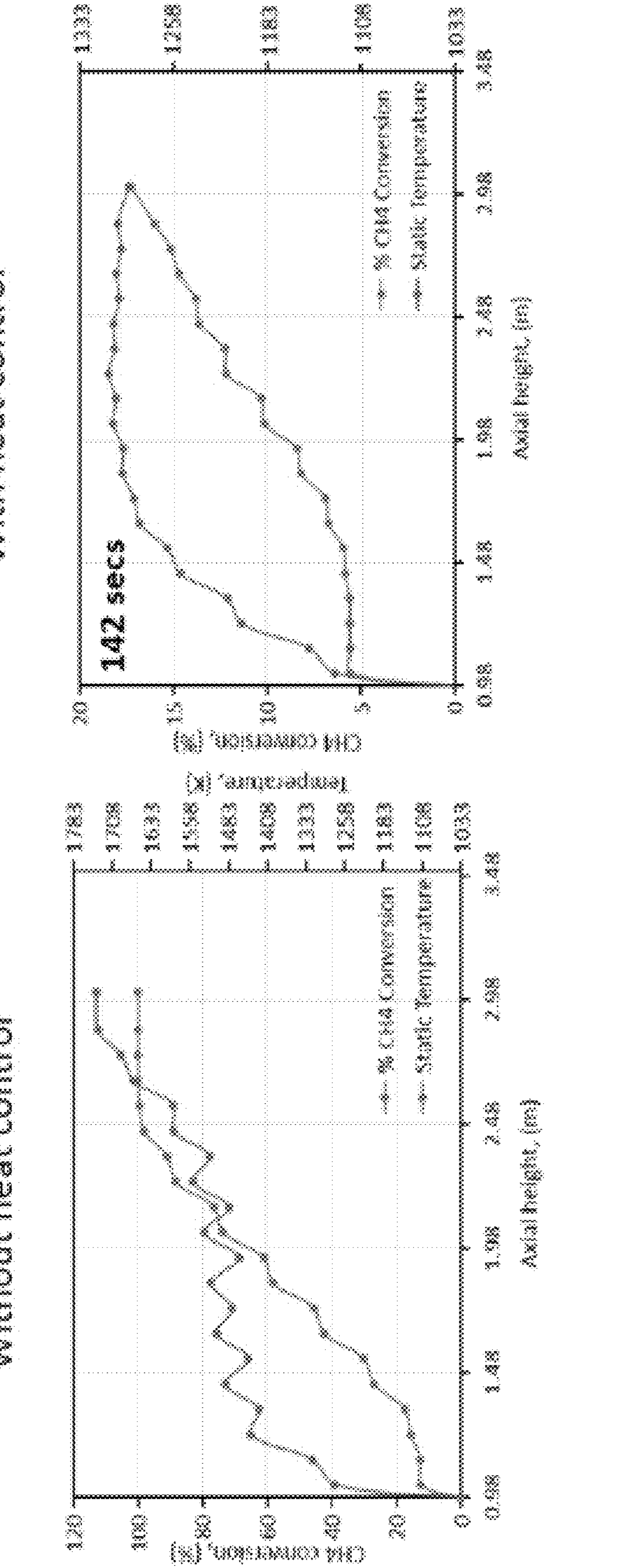
FIGS. 19A and 19B show results of the process run with temperature control (FIG. 19B) as opposed to the results of the process run without temperature control (FIG. 19A).

FIGS. 19A and 19B show results of the process run with temperature control (FIG. 19B) as opposed to the results of the process run without temperature control (FIG. 19A). The maximum temperature of the heating elements reaches about 1748 K when the temperature is not controlled and methane conversion is near 100%. Temperatures above 1373 K are very detrimental to element life, leading to severe cost penalties both for replacement elements and time when the reactor would be out of service replacing the elements. In this Example, the total heat available in both cases was 1660 kW. With temperature control at 1373K the total heat absorbed reached 424 kW, the gas mixture reached 1320 K, and the methane conversion was 17.5%.

The Example shows that a control scheme that limits the heating element temperature can produce significant methane conversion while limiting the maximum temperature of the heating elements, thus leading to a longer life of the heating elements.

Example 5

In this Example a number of metallic cylinders were interspersed between the heating elements, both by alternating with heating elements in some rings and as rings of cylinders alone. The design is that depicted in FIGS. 9, 10, 11, and 12, with a total of 188 heating elements and 676 metal cylinders comprising 12 rings. Rings 1, 3, 5, 8, 10, and 12 comprised heating elements and metal cylinders, the others contained only metal cylinders. The metal cylinders provide additional thermal inertia to the reactor and enhance the heat transfer from the heating elements to the gases.

As in Example 4, each element has 3 independently controlled heating regions along its length, and the rings containing heating elements and solid cylinders were grouped into 3 groups for control purposes, creating 9 separate control units within the reactor. The total energy available if the elements are on continuously would be 1540 kW. The elements are tuned on when their temperature declines to 1353 K and turned off when their temperature reaches 1373 K.

This Example shows that fewer heating elements can be used, and the energy use is more efficient since the elements are turned off part of the time. A larger fraction (42.8%) of the energy available is transferred to the gas, and a larger fraction of the energy transferred is used to convert methane to syngas (43.6%) by the inclusion of metal cylinders; the reactor design uses energy more efficiently for the desired reaction. The methane conversion is also higher (29%) compared to the Example without metal cylinders as heat sinks.

Example 6

As in the previous examples, this example includes a control function to the heating elements in order to prevent any element from exceeding 1373 K, a temperature above which the element life is shortened. There were 8 rings, 5 of which contained heating elements, and 3 of which contained only metal cylinders. Each element is controlled in 3 independent heating regions along its length, and the rings containing heating elements and solid cylinders were grouped into 3 groups for control purposes, creating 9 separate control units within the reactor. The heating element control groups were turned off when the element skin temperature was calculated to reach 1373 K, and the element regions were turned on when the temperature decreased to 1368 K. The design allowed for a small gap of 0.0625 inches (0.16 cm) between the element and the baffles through which each element passes.

The total energy capacity of the unit was 1728 kW, of which 964 kW or 59.4% was transferred to the gas mixture, and 66.2% of the heat transferred was used to convert methane. This example shows that tighter control of the temperature—only 5 K between the maximum and minimum temperature of the elements—provides better efficiency in heat transfer and more efficient of that energy for the chemical conversion of methane.

Example 7

This example repeated the CFD calculation of Example 6 except the range of temperatures allowed on the heating elements was changed to 1398 K to 1403 K. With the higher temperatures the methane conversion was calculated as 90% and the maximum gas temperature was 1373 K.

This example shows that a high methane conversion is obtainable with a reactor design that incorporates both heat sink cylinders and heating elements if the temperature of the gas can reach 1373 K.

Example 8

This example is a repeat of Example 7 except the feed rate was doubled. The heat absorbed by the gas mixture was increased by 30%, reaching 89.1% of that available, showing the enhanced heat transfer with the higher flow rate. The methane conversion reached 50.5% and the energy efficiency was 64.9% used for the chemical conversion of methane, showing that high efficiencies and methane conversions are obtainable with the design.

Example 9

In this example the number of heating elements was increased to 314 and 630 return tubes were used in place of solid heat sink cylinders, all arranged in 11 rows, to permit better heat exchange between the returning gas and the upflow reaction zone. The feed gas was changed to one that mimics a high CO content gas, similar to one expected from a biomass pyrolysis process, and contains a larger fraction of methane (27.5 vol %) but a smaller mass flow rate of methane than in the prior examples. The maximum element temperature was reduced to 1373 to increase element life. The available energy was increased to 2338 kW, of which 67.1% was absorbed by the gas, and 71.4% of that transferred was used to decompose 41.2% of the methane in the feed.

This example shows that a high CO content gas like that from a lower temperature pyrolysis can be effectively processed in the reactor. Moreover, this example shows that the balance between element life (as expressed in maximum element temperature), heat transfer efficiency (as measured in the fraction of energy transferred to the gas), energy efficiency (as measured in fraction of heat used to convert methane), reactor capacity (as measured by the mass of methane converted), and process efficiency (as measured by the fraction of methane converted), are all controllable over a wide range with the design incorporating baffles, electrical heating elements, return tubes, and a control function.

Example 10

The calculation of Example 9 was repeated except higher energy heating elements were used in the CFD analysis. The result is that there is a heating capacity of 2751 kW available and 1784 kW of this is transferred to the gas, of which 73.9% is used for methane conversion.

These results show that the use of higher capacity heating elements can increase the capacity of the reactor as well as increase the mass of methane converted and the efficiency of energy utilization.

TABLE 2

Conditions and results of CFD evaluations of steam reforming.

| | Comp Ex | 1 | 2 | 3 | 4 | 5 | 6 | 7 | 8 | 9 | 10 |
|---|---|---|---|---|---|---|---|---|---|---|---|
| $CH_4$ conversion % | 3.2* | na | 3* | 88 | 17.5 | 29 | 65.5 | 90 | 50.5 | 41.2 | 48.9 |
| Inlet Gas T K | 1033 | 1033 | 1033 | 1033 | 1033 | 1033 | 1033 | 1033 | 1033 | 1033 | 1033 |
| Inlet Gas Flow kg/hr | 1795 | 1795 | 1795 | 1795 | 1795 | 1792 | 1792 | 1792 | 3583 | 3583 | 3583 |
| $H_2$ vol % | 48.5 | 15.4 | 15.4 | 15.4 | 15.4 | 15.4 | 15.4 | 15.4 | 15.4 | 3.0 | 3.0 |
| CO vol % | 16.90 | 0.98 | 0.98 | 0.98 | 0.98 | 0.98 | 0.98 | 0.98 | 0.98 | 26.7 | 26.7 |
| $CO_2$ vol % | 12.4 | 21.8 | 21.8 | 21.8 | 21.8 | 21.8 | 21.8 | 21.8 | 21.8 | 11.0 | 11.0 |
| $CH_4$ vol % | 5.1 | 18.5 | 18.5 | 18.5 | 18.5 | 18.5 | 18.5 | 18.5 | 18.5 | 27.5 | 27.5 |
| $H_2O$ vol % | 17.1 | 42.6 | 42.6 | 42.6 | 42.6 | 42.6 | 42.6 | 42.6 | 42.6 | 26.7 | 26.7 |
| $N_2$ vol % | 0.0 | 0.0 | 0.0 | 0.0 | 0.0 | 0.0 | 0.0 | 0.0 | 0.0 | 5.1 | 5.1 |
| Mass $CH_4$ conv kg/hr | na | na | 7.7 | 224.8 | 44.7 | 74.1 | 167.4 | 230.0 | 258.1 | 150.7 | 179.0 |
| Vessel Diameter in | 63 | 63 | 63 | 63 | 63 | 67 | 96 | 96 | 96 | 96 | 96 |
| Number of Baffles | na | 20 | 20 | 20 | 20 | 20 | 20 | 20 | 20 | 20 | 20 |
| Dist between baffles in | 2 | 4 | 4 | 4 | 4 | 4 | 8 | 8 | 8 | 8 | 8 |
| Heating Element, number | 66 | 192 | 208 | 208 | 208 | 188 | 216 | 216 | 216 | 304 | 304 |
| Blanks | 0 | na | na | na | na | 676 | 460 | 460 | 460 | 0 | 0 |
| Return tubes | 0 | na | na | na | na | 0 | 0 | 0 | 0 | 636 | 636 |
| Diam Inner Ring | 5.5 | 27.24 | 27.89 | 27.89 | 27.89 | 32.89 | 34.49 | 34.49 | 34.49 | 35.07 | 35.07 |
| Diam Outer Ring | 29.5 | 52 | 37.57 | 37.57 | 37.57 | 52.15 | 85.53 | 85.53 | 85.53 | 87.16 | 87.16 |
| Energy Provided - kW | Unlimited | Unlimited | 278 | 1209 | 1660 | 1540 | 1728 | 1728 | 1728 | 2338 | 2751 |
| Heat absorbed kW | | | na | 875 | 394 | 532 | 964 | 1188 | 1540 | 1568 | 1784 |
| Sensible heat kW | | | na | na | 244 | 244 | 284 | 296 | 540 | 448 | 484 |
| Reaction heat kW | | | na | na | 150 | 288 | 680 | 892 | 1000 | 1120 | 1300 |
| % Transferred to Gas | | | na | 72.4% | 23.7% | 42.8% | 59.4% | 68.7% | 89.1% | 67.1% | 64.0% |
| % Used for $CH_4$ conv | | | na | na | 38.1% | 43.6% | 66.2% | 75.1% | 64.9% | 71.4% | 73.9% |
| Control | no | no | no | no | Yes | Yes | Yes | Yes | Yes | Yes | Yes |
| Max Element Temp, K | 1373 | 1448 | 1375 | 1548 | 1373 | 1373 | 1373 | 1403 | 1403 | 1373 | 1373 |
| Max Gas Temp, K | 1232 | 1373 | 1203 | 1410 | 1320 | 1330 | 1334 | 1373 | 1349 | 1321 | 1326 |

*separate calculation.

Various aspects (X1-X49) of different embodiments of the present invention are also expressed below:

X1.) A reactor for conducting endothermic reactions of a feed fluid, the reactor comprising:

an external cylindrical shell having a flow path extending within the shell assembly from the inlet to the outlet and defining a cylindrical reaction plenum;

a cylindrical outlet plenum attached at the end of the cylindrical shell;

an inlet conduit configured to receive fluid and an outlet conduit configured to discharge the fluid, the inlet conduit being in fluid communication with the cylindrical reaction plenum or an annular plenum in fluid communication with the cylindrical reaction plenum, and the outlet conduit is in fluid communication with the cylindrical outlet plenum, d) One or more cylindrical return tubes disposed within the cylindrical reaction plenum, and where the cylindrical reaction plenum is in fluid communication with the one or more cylindrical return tubes, e) Two or more baffles that are perpendicular to the axis of the cylindrical shell within the cylindrical reaction plenum or the one or more return tubes or both, f) A passage through each of the one or more baffles that is less than 20% of the cross-sectional area of each baffle in the cylindrical reaction plenum or return tube, such that the passages of any two consecutive baffles alternate in their distance from the axis of the cylindrical reaction plenum or return tube, g) One or more electrically driven heating elements within the shell and disposed parallel to the axis of the shell and extending through one or more of the baffles.

X2.) The reactor wherein the annular plenum and the cylindrical outlet plenum are coaxial, at the bottom of the device with respect to gravity, and the annular plenum surrounds the cylindrical outlet plenum.

X3.) The reactor wherein the reactant stream enters and exits at the bottom of the device with respect to gravity.

X4.) The reactor wherein the cylindrical reaction plenum or the one or more cylindrical return tubes or both comprise one or more heat sink cylinders.

a) The reactor of wherein the heat sink cylinders comprise materials having greater absorptivity than emissivity.

b) The reactor of wherein the heat sink cylinders comprise metal or ceramic materials.

X5.) The reactor wherein the external cylindrical shell of the vessel has a diameter of at least 1 foot (30 cm), or at least 3 feet (90 cm), or at least 5 feet (150 cm), or at least 8 feet (240 cm), or from 1 to 30 feet (30 to 900 cm), or from 3 to 20 feet (90 to 600 cm), or from 5 to 12 feet (150 to 360 cm), and a length of at least 5 feet (150 cm), or at least 8 feet (240 cm), or at least 11 feet (330 cm), or no more than 15 feet (450 cm), or no more than 10 feet (300 cm), or no more than 8 feet (240 cm).

X6.) The reactor wherein the materials of construction of the reactor comprise nickel.

X7.) The reactor wherein the heating elements comprise more than one independently controllable heating section.

X8.) The reactor wherein the reactor comprises at least 4, or at least 10, or at least 20 or at least 30 baffles, or from 2 to 60, or from 4 to 30 baffles.

X9.) The reactor wherein the baffles are regularly spaced along the axis of the cylindrical reaction plenum.

X10.) The reactor wherein the baffles are separated by at least 1 inch (2.5 cm), or at least 2 inches (5.0 cm), or at least 4 inches (10 cm), or at least 6 inches (15 cm), or at least 8 inches (20 cm), or at least 12 inches (30 cm), or at least 18 inches (45 cm), or from 1 to 24 inches (2.5 to 60 cm), or from 2 to 18 inches (5 to 45 cm), or from 4 to 12 inches 10 to 30 cm) from each other.

X11.) The reactor wherein the baffles are at least 0.125 in (0.3175 cm), or 0.25 in (0.6350 cm), or 0.5 in (1.25 cm), or 1.0 in (2.5 cm), or 1.5 in (3.75 cm), or 2.0 in (5 cm) or 3 in (7.5 cm), or 4 in (10 cm) thick, or are from 0.25 in (0.6350 cm) to 6 in (15 cm), or from 1.0 in (2.5 cm) to 4.0 in (10 cm) thick, or no more than 4.0 in (10 cm), or no more than 2.0 in (5 cm), or no more than 1.0 in (2.5 cm), or no more than 0.5 in (1.25 cm) thick.

X12.) The reactor wherein the baffles that are fitted within the cylindrical reaction plenum or those that are fitted within a return tube include an open portion that is at least 0.1%, or at least 0.5%, at least 1%, or at least 2%, or at least 3%, or from 0.01% to 5%, or from 0.1% to 2%, or no more than 10%, or no more than 3%, or no more than 1%, or no more than 0.5% of the cross sectional area of the cylindrical reaction plenum or the cross sectional area of the return tube.

X13.) The reactor wherein the baffles within the cylindrical reaction plenum or the return tubes contain openings for each of the heating elements that pass through the baffle with a clearance of at least 0.001 in (0.0025 cm), or at least 0.01 in (0.025 cm), or at least 0.016 in (0.041 cm), or from 0.001 to 0.1 in (0.0025 to 0.25 cm), or no more than 0.02 in (0.05 cm), or no more than 0.16 in (0.041 cm) between the heating element and the baffle.

X14.) The reactor wherein the length of the external cylindrical shell exceeds the length of the one or more return tubes by at least 2 in (5 cm), or at least 4 in (10 cm), or at least 8 in (20 cm), or at least 12 in (30 cm), or from 2 to 60 in (5 to 150 cm), or 4 to 12 in (10 to 30 cm).

X15.) The reactor wherein and the diameter of the one or more return tubes is at least 0.5 in (1.25 cm), or at least 1.0 in (2.5 cm), or at least 2 in (5 cm) or at least 5 in (12.5 cm), or at least 12 in (30 cm) in diameter, or from 0.5 in (1.25 cm) to 60 in (180 cm), or 0.75 in (1.9 cm) to 24 in (60 cm), or 1.0 in (2.5 cm) to 12 in (30 cm), or no more than 5 in (12.5 cm) or no more than 2 in (5.0 cm), or no more than 1 in (2.5 cm), or no more than 0.75 in (1.9 cm) in diameter.

X16.) The reactor wherein the elements, i.e. heating elements or return tubes or heat sink cylinders, or some combination thereof, are disposed in the cylindrical reaction plenum in one or more concentric rings coaxial with the axis of the reaction plenum.

X17.) The reactor of any of the preceding claims wherein the number of rings of elements within the reaction plenum or within any one of the one more return tubes is 1, or 2, or 4, or 6, or 8, or 9, or 11, or at least 2, or at least 4, or at least 8, or no more than 20, or no more than 12 rings.

X18.) The reactor wherein the diameter of the rings containing heating elements or return tubes or heat sink cylinders, or some combination thereof, that are coaxial with the reaction cylinder or return tube, is at least 5%, or at least 10%, or at least 15%, or from 5% to 95%, or from 10% to 90%, or from 15% to 95% of the diameter of a baffle within the cylindrical reaction plenum.

X19.) The reactor wherein rings of elements without heating elements are disposed in the cylindrical reaction plenum in concentric rings that alternate with rings comprising heating elements or can be placed next to each other.

X20.) The reactor wherein the heating elements alternate with heat sink cylinders or return tubes within one or more of the concentric rings.

X21.) The reactor wherein the heating elements disposed in the cylindrical reaction plenum in concentric rings are interspersed with heat sink cylinders or return tubes or both such that no heating element is in a direct radial line from the axis of the device as another heating element without an intervening heat sink cylinder or return tube between any two such heating elements.

X22.) The reactor wherein the heating elements disposed in the annular reaction plenum in any concentric ring alternate with heat sink cylinders or return tubes or both such that no heating element is in a direct circumferential line with respect to the axis of the device without an intervening heat sink cylinder or return tube between any two such heating elements.

X23.) The reactor wherein the cylindrical reaction plenum is at least partially filled with solid catalyst.

X24.) The reactor wherein at least a portion of the internal surfaces of the reactor comprise catalytically reactive materials.

X25.) The reactor wherein at least a portion of the internal surfaces have been coated with metal oxides of zirconium, cerium, aluminum, silicon, magnesium, rare earths (lanthanides—elements 57 through 71 of the Periodic Table-scandium, and yttrium), or some combination of these.

X26.) The reactor wherein at least a portion of the internal surfaces have been treated by exposure to aluminum trichloride vapor.

X27.) The reactor wherein at least a portion of the internal surfaces have been coated with catalytically active materials that comprise nickel.

X28.) The reactor wherein thermocouples or optical sensors or pressure sensors or product composition sensors are fitted within or adjacent to the reactor vessel.

X29.) The reactor wherein thermocouples or optical sensors or pressure sensors are fitted within the reactor vessel and at least a portion of one or more of the heating elements is controlled by supplying power in response to the temperatures measured by the thermocouples or signals from the optical or pressure or product composition sensors.

X30.) The reactor wherein the energy supplied to at least a portion of the heating elements is provided in an on or off pattern, i.e. a square wave, or in a proportional amount, i.e. a curved or sinusoidal wave, depending on the feedback from the thermocouples or optical or pressure or the product composition sensors.

X31.) The reactor of any of the preceding claims comprising a lid or cap that encloses the top of the reactor across the breadth of the reactor shell and seals the reactor shell from the exterior environment.

X32.) The reactor of any of the preceding claims comprising a thermal barrier above the reactor.

X33.) The reactor wherein the cylindrical reactor shell and a lid or cap are contained in a pressure shell.

X34.) The reactor wherein insulating materials are disposed within or around the cylindrical reactor shell.

X35.) The reactor wherein the pressure in the reactor is at least 101 kPa (1 bar), or at least 200 kPa (2 bar), or at least 500 kPa (5 bar), or at least 800 kPa (8 bar), or at least 1500 kPa (15 bar), or from 101 to 5000 kPa (1 to 50 bar), or from 500 to 2500 kPa (5 to 25 bar).

X36.) The reactor wherein the reactor comprises mechanical support structures such as one or more hoops or rings that encircle the reactor shell, or some combination of these.

X37.) A process for the thermal conversion of hydrocarbon containing gas mixtures to hydrogen or hydrogen and carbon monoxide containing synthesis gas mixtures via steam reforming comprising:

a) Passing a gaseous feed mixture comprising hydrocarbons and steam to a reactor comprising, i) An external cylindrical shell, having a flow path extending within the shell assembly from the inlet to the outlet and defining a cylindrical reaction plenum, ii) A cylindrical outlet plenum attached at the end of the cylindrical shell, iii) An inlet conduit for receiving fluid and an outlet conduit for discharging fluid, where the inlet conduit is in fluid communication with the cylindrical reaction plenum or an annular plenum in fluid communication with the cylindrical reaction plenum, and the outlet conduit is in fluid communication with the cylindrical outlet plenum, iv) One or more cylindrical return tubes disposed within the cylindrical reaction plenum, and where the cylindrical reaction plenum is in fluid communication with the one or more cylindrical return tubes, v) Two or more baffles that are perpendicular to the axis of the cylindrical shell within the cylindrical reaction plenum or the one or more return tubes or both, vi) A passage through each of the one or more baffles that is less than 20% of the cross-sectional area of each baffle in the cylindrical reaction plenum or return tube, such that the passages of any two consecutive baffles alternate in their distance from the axis of the cylindrical reaction plenum or return tube, vii) One or more electrically driven heating elements within the shell and disposed parallel to the axis of the shell and extending through one or more of the baffles.

b) Applying heat to the reactor via the heating elements, and c) Recovering from the outlet conduit a product comprising hydrogen or carbon monoxide or both.

X38.) The process wherein hydrogen is separated from the product mixture.

X39.) The process wherein the product mixture is converted to a hydrogen rich mixture in a water gas shift reactor.

X40.) The process wherein the feed mixture is reformed in a pre-reformer before passage into the reactor.

X41.) The process wherein the feed mixture is treated to remove sulfur containing components, nitrogen containing components, or both before passage into the reactor.

X42.) The process wherein the feed mixture is treated to remove chlorine containing components before passage into the reactor.

X43.) The process of any of the preceding claims wherein the product mixture is treated to remove sulfur containing components, nitrogen containing components, or both.

X44.) A reaction system for conducting endothermic reactions comprising providing:

a) A gaseous feed mixture, b) An external cylindrical shell, having a flow path extending within the shell assembly from the inlet to the outlet and defining a cylindrical reaction plenum, c) A cylindrical outlet plenum attached at the end of the cylindrical shell, d) An inlet conduit for receiving fluid and an outlet conduit for discharging fluid, where the inlet conduit is in fluid communication with the cylindrical reaction plenum or an annular plenum in fluid communication with the cylindrical reaction plenum, and the outlet conduit is in fluid communication with the cylindrical outlet plenum, e) One or more cylindrical return tubes disposed within the cylindrical reaction plenum, and where the cylindrical reaction plenum is in fluid communication with the one or more cylindrical return tubes, f) Two or more baffles that are perpendicular to the axis of the cylindrical shell within the cylindrical reaction plenum or the one or more return tubes or both, g) A passage through each of the one or more baffles that is less than 20% of the cross-sectional area of each baffle in the cylindrical reaction plenum or return tube, such that the passages of any two consecutive baffles alternate in their distance from the axis of the cylindrical reaction plenum or return tube, h) One or more electrically driven heating elements within the shell and disposed parallel to the axis of the shell and extending through one or more of the baffles.

X45.) The reaction system wherein the feed mixture comprises hydrocarbons.

X46.) The reaction system wherein the feed mixture comprises ammonia.

X47.) The reaction system wherein the feed mixture comprises methanol.

X48.) The reaction system wherein the feed mixture comprises ethyl benzene.

X49.) The reaction system wherein the feed mixture comprises methane and ammonia.

While the inventions have been illustrated and described in detail in the drawings and foregoing description, the same is to be considered as illustrative and not restrictive in character, it being understood that only certain embodiments have been shown and described and that all changes and modifications that come within the spirit of the inventions are desired to be protected.

What is claimed is:

1. An apparatus for conducting an endothermic reaction in a feed fluid in a cylindrical reaction plenum extending about an axis, the apparatus comprising:

a shell configured to bound the cylindrical reaction plenum;

a first discoidal baffle providing a first feed fluid flow passage therethrough, the first discoidal baffle being arranged to be diametrically perpendicular to the axis of the cylindrical reaction plenum within the cylindrical reaction plenum and to position the first feed fluid flow passage within the cylindrical reaction plenum;

a second discoidal baffle providing a second feed fluid flow passage therethrough, the second discoidal baffle being arranged to be diametrically perpendicular to the axis of the cylindrical reaction plenum within the cylindrical reaction plenum and to radially offset the second feed fluid flow passage from the first feed fluid flow passage within the cylindrical reaction plenum relative to the axis of the cylindrical reaction plenum;

a cylindrical return tube arranged to extend, within the cylindrical reaction plenum, parallelly to the axis thereof, and in fluid communication therewith, through the first discoidal baffle and the second discoidal baffle; and an electric heating element arranged to extend, within the cylindrical reaction plenum and parallelly to the axis thereof, at least from one of the first discoidal baffle and the second discoidal baffle toward another of the first discoidal baffle and the second discoidal baffle.

2. The apparatus of claim 1, wherein the first discoidal baffle is arranged to have a first cross-sectional area diametrically perpendicular to the axis of the cylindrical reaction plenum within the cylindrical reaction plenum, and wherein the first feed fluid flow passage has a first free flow area being less than 20% of the first cross-sectional area.

3. The apparatus of claim 2, wherein the second discoidal baffle is arranged to have a second cross-sectional area diametrically perpendicular to the axis of the cylindrical reaction plenum within the cylindrical reaction plenum, and wherein the second feed fluid flow passage has a second free flow area being less than 20% of the second cross-sectional area.

4. The apparatus of claim 3, wherein at least one of the shell and the cylindrical return tube comprises a heat sink cylinder.

5. The apparatus of claim 4, wherein the heat sink cylinder comprises materials having greater absorptivity than emissivity.

6. The apparatus of claim 1, wherein at least one of the shell and the cylindrical return tube comprises a heat sink cylinder.

7. The apparatus of claim 6, wherein the heat sink cylinder comprises materials having greater absorptivity than emissivity.

8. The apparatus of claim 1, comprising:

a plurality of electric heating elements, wherein the plurality of electric heating elements comprises a plurality of independently controllable heating sections.

9. The apparatus of claim 3, comprising:

a plurality of electric heating elements, wherein the plurality of electric heating elements comprises a plurality of independently controllable heating sections.

10. The apparatus of claim 9, comprising:

at least one of a plurality of cylindrical return tubes arranged to extend, within the cylindrical reaction plenum, parallelly to the axis thereof, and in fluid communication therewith, through the first discoidal baffle and the second discoidal baffle and a plurality of heat sink cylinders arranged to be disposed within the cylindrical reaction plenum, wherein the at least one of the plurality of cylindrical return tubes and the plurality of heat sink cylinders are arranged to be disposed within the cylindrical reaction plenum a first radial distance from the axis of the cylindrical reaction plenum, and wherein the plurality of electric heating elements is arranged to be disposed within the cylindrical reaction plenum a second radial distance differing from the first radial distance.

11. The apparatus of claim 9, comprising:

a plurality of cylindrical return tubes arranged to extend, within the cylindrical reaction plenum, parallelly to the axis thereof, and in fluid communication therewith, through the first discoidal baffle and the second discoidal baffle, wherein ones of the plurality of cylindrical return tubes are arranged to be alternately disposed around the axis of the cylindrical reaction plenum with ones of the plurality of electric heating elements within the cylindrical reaction plenum at a common radial distance from the axis of the cylindrical reaction plenum.

12. The apparatus of claim 11, comprising:

a plurality of heat sink cylinders arranged to be disposed within the cylindrical reaction plenum, wherein ones of the plurality of heat sink cylinders are arranged to be alternately disposed around the axis of the cylindrical reaction plenum with pairs of other components, each of the pairs of other components comprising a cylindrical return tube and an electric heating element, within the cylindrical reaction plenum at a common radial distance from the axis of the cylindrical reaction plenum.

* * * * *